(12) United States Patent
Maekawa et al.

(10) Patent No.: US 8,583,665 B2
(45) Date of Patent: Nov. 12, 2013

(54) INFORMATION PROCESSING DEVICE, CLIENT DEVICE, SERVER DEVICE, LIST GENERATION METHOD, LIST ACQUISITION METHOD, LIST PROVIDING METHOD AND PROGRAM

(75) Inventors: Munechika Maekawa, Kanagawa (JP); Takaomi Kimura, Tokyo (JP); Takuo Ikeda, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/052,872

(22) Filed: Mar. 21, 2011

(65) Prior Publication Data
US 2011/0246508 A1  Oct. 6, 2011

(30) Foreign Application Priority Data
Apr. 6, 2010  (JP) ................. P2010-087853

(51) Int. Cl.
*G06F 17/30*  (2006.01)
(52) U.S. Cl.
USPC .......................................... 707/754; 707/769
(58) Field of Classification Search
USPC .................................. 707/754, 769
See application file for complete search history.

(56) References Cited

U.S. PATENT DOCUMENTS

| 7,345,232 | B2 * | 3/2008 | Toivonen et al. ............... 84/615 |
| 7,698,300 | B2 * | 4/2010 | Yamamoto ............. 707/999.107 |
| 7,848,531 | B1 * | 12/2010 | Vickers et al. ................. 381/107 |
| 8,180,770 | B2 * | 5/2012 | Ranasinghe et al. .......... 707/732 |
| 2004/0030691 | A1 * | 2/2004 | Woo ................................ 707/3 |
| 2012/0296908 | A1 * | 11/2012 | Bach et al. .................... 707/737 |

FOREIGN PATENT DOCUMENTS

| JP | 2005-274708 | 10/2005 |
| JP | 2007-164020 | 6/2007 |
| JP | 2008-123011 | 5/2008 |

* cited by examiner

*Primary Examiner* — Kim Nguyen
(74) *Attorney, Agent, or Firm* — Finnegan Henderson Farabow Garrett & Dunner LLP

(57) ABSTRACT

There is provided an information processing device including a plurality of specifying devices used to respectively specify a plurality of types of parameter values representing music features; a music extraction portion that extracts, from a first database in which a plurality of pieces of music and the parameter values are associated with each other, pieces of music that match the parameter values specified using the specifying devices; and a list generation portion that generates a list of the pieces of music extracted by the music extraction portion.

16 Claims, 16 Drawing Sheets

FIG.3

| TYPE | CONTENT |
|---|---|
| tempo | MUSIC TEMPO (e.g. tempo = 60 - 180 [BPM])) |
| happy | LEVEL OF HAPPINESS OF MUSIC (e.g. happy = 0 - 100) |
| acoustic | ACOUSTIC LEVEL OF MUSIC (e.g. acoustic = 0 - 100) |
| major | LEVEL OF FAME OF MUSIC (e.g. major = 0 - 100) |
| decade | DECADE OF MUSIC (e.g. decade = 60s, 70s, ..., 00s) |
| time channel | TIME CHANNEL |
| mood channel | MOOD CHANNEL |
| event | EVENT INFORMATION (e.g. CHRISTMASSY MUSIC ETC.) |
| ... | ... |
| artist | ARTIST NAME INITIALS A TO Z |

FIG.7

FEATURE QUANTITY META DATABASE

| Song ID | amplitude | tempo | cadence | choed complexity | acoustic | paino |
|---------|-----------|-------|---------|------------------|----------|-------|
| 000001  | 16        | 130   | 45      | 36               | 55       | 11    |
| 000002  | 0         | 78    | 87      | 89               | 12       | 53    |
| ...     | ...       | ...   | ...     | ...              | ...      | ...   |
| 999999  | 6         | 133   | 33      | 12               | 77       | 77    |

FIG.8

MUSIC BASIC META DATABASE

| Song ID | title | album | artist | content file |
|---|---|---|---|---|
| 000001 | To Mererl E Lune | Hallgato Loment | Szaloki Age | ../music/a01.mp3 |
| 000002 | Act Of The Apastle | God Help The Boy | God Help The Boy | ../music/a02.wma |
| ... | ... | ... | ... | ... |
| 999999 | Waltz For Dove | Waltz For Dove Live | Bill Even | ../usic/x99.wav |

FIG.9

RANKING DATABASE

| Song ID | CHART TYPE | HIGHEST RANKING | LOWEST RANKING | NUMBER OF CONTINUOUS WEEKS IN CHART | AVERAGE RANKING | FIRST DATE TO ENTER CHART |
|---|---|---|---|---|---|---|
| 000001 | TOP 100 HITS | 1 | 100 | 35 | 50 | 2000/1/1 |
| 000002 | TOP 100 HITS | 8 | 89 | 12 | 33 | 2010/2/15 |
| ... | ... | ... | ... | ... | ... | ... |
| 999999 | TOP 10 IN THE 80S | 5 | 9 | 2 | 7 | 1981/7/1 |

(SYSTEM CONFIGURATION EXAMPLE OF SERVER-CLIENT TYPE)

INFORMATION PROCESSING DEVICE, CLIENT DEVICE, SERVER DEVICE, LIST GENERATION METHOD, LIST ACQUISITION METHOD, LIST PROVIDING METHOD AND PROGRAM

BACKGROUND OF THE INVENTION

1. Field of the Invention

The present invention relates to an information processing device, a client device, a server device, a list generation method, a list acquisition method, a list providing method and a program.

2. Description of the Related Art

In recent years, most music players have a function that sorts music (or songs) using meta data. When music data is stored in a music player, the music player automatically generates and displays a list of music by genre, artist, date, or frequency of playback, for example, or the music player automatically displays the music in a hierarchical manner. Further, most of the music players are provided with a playlist registration function so that a user can collectively manage favorite music. Many users create playlists according to environment and activities etc., such as a playlist for "sleeping" in which pieces of music that induce sleep are collected in order to be listened to at bedtime, and a playlist for "running" in which pieces of music with a good tempo are collected in order to be listened to while running. In relation to playlists for the music player, Japanese Patent Application Publication No. JP-A-2007-164020 discloses a method for selecting a playlist or music according to a walking tempo.

SUMMARY OF THE INVENTION

However, in order to create a playlist, operations are necessary in which the user selects desired pieces of music one by one from a group of music pieces and registers the selected pieces of music in the playlist. Further, in order to perform the operations, it is necessary for the user to know in advance all the music included in the group of music pieces. In many cases, it is assumed that the user has already listened to the music owned by the user at least once. However, when creating a playlist, many users listen to the music once more to recall the mood of the music. Therefore, a great effort is necessary to create the playlist. Having said that, the number of pieces of music owned by an individual user is at most about several hundreds, and it is therefore possible to manually create the playlist. On the other hand, it is very difficult for a music seller or a music distribution service provider, who manages an enormous amount of music (thousands or tens of thousands of pieces of music), to manually create the playlist.

As described above, a great effort is needed for operations to create a playlist by selecting pieces of music with a specified feature from a group of music pieces including many pieces of music. Particularly, a large amount of time and a great effort are required for the operation of listening to the pieces of music one by one. Therefore, if it is possible to extract the pieces of music with the specified feature from the group of music pieces without listening to the music, it is possible to significantly reduce an operation load to create the playlist. A method that uses meta data is known as a method for classifying pieces of music included in a group of music pieces without listening to the pieces of music. In many cases, the meta data includes information such as genres, artist names, album names and music titles. Therefore, the use of the meta data makes it possible to classify the pieces of music by genre, by artist or by album, or to arrange the pieces of music in an alphabetical order of music titles.

However, the playlist is created by classification based on the subjectivity of the user. Therefore, in many cases, it is not possible to easily perform classification by genre, artist, album or the like. Further, information of the genre etc. is added by a music provider, such as a music producer or a music seller, at his/her own discretion. Therefore, in many cases, the definition of the genre etc. is not uniform, or deviates from the user's perception. Further, the user who does not know the artist name, the album name or the like cannot create the playlist by searching for favorite pieces of music based on the artist name, the album name or the like. As described above, it is difficult to create a playlist by automatically extracting pieces of music that match the user's preference (the mood of desired pieces of music), from a group of music pieces including many pieces of music for which there is no advance information.

In light of the foregoing, it is desirable to provide an information processing device, a client device, a server device, a list generation method, a list acquisition method, a list providing method and a program that are novel and improved and that are capable of dynamically extracting a group of music pieces with a specified feature and generating a list of the pieces of music.

According to an embodiment of the present invention, there is provided an information processing device including a plurality of specifying devices used to respectively specify a plurality of types of parameter values representing music features; a music extraction portion that extracts, from a first database in which a plurality of pieces of music and the parameter values are associated with each other, pieces of music that match the parameter values specified using the specifying devices; and a list generation portion that generates a list of the pieces of music extracted by the music extraction portion.

The information processing device may further include a specifying device management portion that selects the parameter value type that matches at least a preference of a user, and causes the specifying device that corresponds to the selected parameter value type to be in an operable state.

The information processing device may further include an information holding portion that holds a combination of a type of the specifying device that is caused to be in the operable state by the specifying device management portion and the parameter value specified using the specifying device. In a predetermined case, the music extraction portion extracts pieces of music that match the type of the specifying device held by the information holding portion and the parameter value specified using the specifying device.

The information processing device may further include an information disclosure portion that discloses the combination of the type of the specifying device that is caused to be in the operable state by the specifying device management portion and the parameter value specified using the specifying device. Another information processing device that receives the type of the specifying device and the parameter value disclosed by the information disclosure portion is allowed to extract, from a second database in which a plurality of pieces of music and the parameter values are associated with each other, pieces of music that match the type of the specifying device and the parameter value that have been received.

The information processing device may further include an information receiving portion that receives, from the other information processing device, a combination of the type of the specifying device and the parameter value that can be specified using the specifying device. The music extraction portion is capable of extracting pieces of music that match the type of the specifying device and the parameter value specified using the specifying device that have been received by the information receiving portion.

The information processing device may further include a type selection portion used to select a plurality of types of the parameter values that have been set in advance; a normalization portion that normalizes a combination of parameter values that correspond to the types selected using the type selection portion to a scalar quantity in a predetermined range; and a specifying device generation portion that sets the scalar quantity normalized by the normalization portion as a new type of parameter value, and generates a specifying device used to specify the new type of parameter value.

The information processing device may further include a display portion that displays the list of the pieces of music that is generated by the list generation portion; and an image holding portion that holds an image that corresponds to each of the pieces of music stored in the first database. When the list of the pieces of music is displayed, the display portion generates divided images by dividing the image held in the image holding portion so as to match frames of the respective pieces of music included in the list of the pieces of music, and displays, in the respective frames, the divided images of the image that corresponds to the pieces of music of the respective frames.

According to an embodiment of the present invention, there is provided a client device including a plurality of specifying devices used to respectively specify a plurality of types of parameter values representing music features; a parameter transmitting portion that transmits to a server device the parameter values specified using the plurality of specifying devices; and a list receiving portion that, after the server device has extracted, from a first database in which a plurality of pieces of music and the parameter values are associated with each other, pieces of music that match the parameter values transmitted by the parameter transmitting portion and a list of the extracted pieces of music has been generated, receives the generated list of the pieces of music.

According to an embodiment of the present invention, there is provided a server device including a parameter receiving portion that receives parameter values specified by a client device that includes a plurality of specifying devices used to respectively specify a plurality of types of parameter values representing music features; a music extraction portion that extracts, from a first database in which a plurality of pieces of music and the parameter values are associated with each other, pieces of music that match the parameter values received by the parameter receiving portion; a list generation portion that generates a list of the pieces of music extracted by the music extraction portion; and a list transmitting portion that transmits, to the client device, the list of the pieces of music that is generated by the list generation portion.

According to an embodiment of the present invention, there is provided a list generation method, including the steps of extracting pieces of music that match parameter values specified using a plurality of specifying devices used to respectively specify a plurality of types of parameter values representing music features, from a first database in which a plurality of pieces of music and the parameter values are associated with each other; and generating a list of the pieces of music extracted in the music extracting step.

According to an embodiment of the present invention, there is provided a list acquisition method, including the steps of transmitting, to a server device from a client device that includes a plurality of specifying devices used to respectively specify a plurality of types of parameter values representing music features, the parameter values specified using the plurality of specifying devices; and receiving, after the server device has extracted, from a first database in which a plurality of pieces of music and the parameter values are associated with each other, pieces of music that match the parameter values transmitted in the parameter transmitting step and a list of the extracted pieces of music has been generated, the generated list of the pieces of music from the server device.

According to an embodiment of the present invention, there is provided a list providing method, including the steps of receiving parameter values specified by a client device that includes a plurality of specifying devices used to respectively specify a plurality of types of parameter values representing music features; extracting, from a first database in which a plurality of pieces of music and the parameter values are associated with each other, pieces of music that match the parameter values received in the parameter receiving step; generating a list of the pieces of music extracted in the music extracting step; and transmitting, to the client device, the list of the pieces of music that is generated in the list generating step.

According to an embodiment of the present invention, there is provided a program that has instructions that command a computer to perform a music extraction function that extracts pieces of music that match parameter values specified using a plurality of specifying devices used to respectively specify a plurality of types of parameter values representing music features, from a first database in which a plurality of pieces of music and the parameter values are associated with each other; and a list generation function that generates a list of the pieces of music extracted by the music extraction function.

According to an embodiment of the present invention, there is provided a program that has instructions that command a computer to perform a parameter transmitting function that transmits, to a server device, parameter values specified using a plurality of specifying devices used to respectively specify a plurality of types of parameter values representing music features; and a list receiving function that, after the server device has extracted, from a first database in which a plurality of pieces of music and the parameter values are associated with each other, pieces of music that match the parameter values transmitted by the parameter transmitting function and a list of the extracted pieces of music has been generated, receives from the server device the generated list of the pieces of music.

According to an embodiment of the present invention, there is provided a program that has instructions that command a computer to perform a parameter receiving function that receives parameter values specified by a client device that includes a plurality of specifying devices used to respectively specify a plurality of types of parameter values representing music features; a music extraction function that extracts, from a first database in which a plurality of pieces of music and the parameter values are associated with each other, pieces of music that match the parameter values received by the parameter receiving function; a list generation function that generates a list of the pieces of music extracted by the music extraction function; and a list transmitting function that transmits, to the client device, the list of the pieces of music that is generated by the list generation function.

According to another embodiment of the present invention, there is provided a recording medium in which the program is recorded, the recording medium being able to be read by a computer.

According to the present invention described above, it is possible to dynamically extract a group of music pieces with a specified feature and to generate a list of the pieces of music.

BRIEF DESCRIPTION OF THE DRAWINGS

FIG. 3 is an explanatory diagram showing specifying device types according to the embodiment;

FIG. 7 is an explanatory diagram showing an example of a configuration of a feature quantity meta database according to the embodiment;

FIG. 8 is an explanatory diagram showing an example of a configuration of a music basic meta database according to the embodiment;

FIG. 9 is an explanatory diagram showing an example of a configuration of a ranking meta database according to the embodiment;

DETAILED DESCRIPTION OF THE EMBODIMENT(S)

Figure 1:
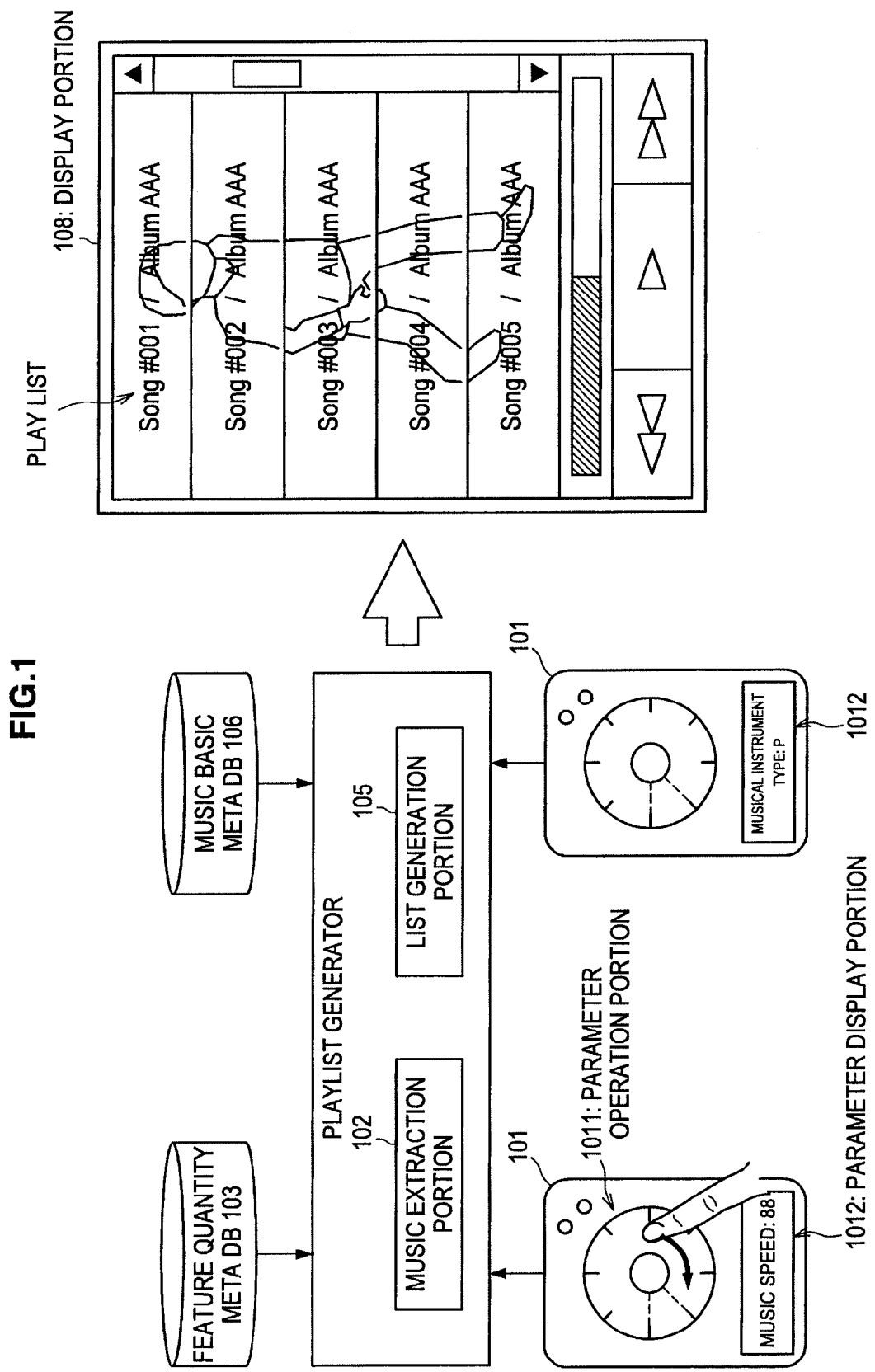
FIG. 1 is an explanatory diagram showing a configuration of a playlist generator according to an embodiment of the present invention.

Hereinafter, preferred embodiments of the present invention will be described in detail with reference to the appended drawings. Note that, in this specification and the appended drawings, structural elements that have substantially the same function and configuration are denoted with the same reference numerals, and repeated explanation of these structural elements is omitted.

Flow of Explanation

Here, a flow of explanation of an embodiment of the present invention to be described below will be briefly described. First, an overview of a playlist generation method according to the present embodiment will be explained with reference to FIG. 1 to FIG. 4. Next, a playlist exchange method according to the present embodiment will be briefly explained with reference to FIG. 5. Then, a playlist display method according to the present embodiment will be briefly explained with reference to FIG. 1 and FIG. 5.

Next, a configuration of a playlist generation system 10 according to the present embodiment will be explained with reference to FIG. 6 to FIG. 13. In this explanation, the playlist generation method, a playlist management method, a parameter specifying device addition method and the like according to the present embodiment will be explained in detail. Then, an example of a system configuration of the playlist generation system 10 according to the present embodiment will be explained with reference to FIG. 14 and FIG. 15.

Next, an example of a hardware configuration that is capable of achieving functions of the playlist generation system 10, a client device 11 and a server device 12 according to the present embodiment will be explained with reference to FIG. 16. Lastly, technical concepts of the present embodiment will be summarized, and advantageous effects derived from the technical concepts will be briefly explained.

Items to be Explained

1: Introduction 1-1: Playlist generation method 1-2: Playlist exchange method 1-3: Playlist display method 2: Configuration of playlist generation system 10

2-1: Overall configuration 2-2: Configuration of specifying device management portion 112

2-3: System configuration examples

3: Hardware configuration

4: Conclusion

Embodiment

Hereinafter, the embodiment of the present invention will be explained.

1: INTRODUCTION

First, the overview of the playlist generation method and the like according to the present embodiment will be explained. The present embodiment relates to a method for generating a playlist of pieces of music with a feature that a user likes, from among a group of music pieces that the user does not know. Further, hereinafter, the playlist exchange method and the playlist display method will also be explained in conjunction with the playlist generation method according to the present embodiment. Particularly, a system will be explained which makes it possible to efficiently extract a piece of music that matches a user's preference from a certain group of music pieces, or which makes it possible to store the mood of the piece of music or to share the mood of the piece of music with another person. These points will be explained below.

1-1: Playlist Generation Method

First, the playlist generation method according to the present embodiment will be briefly explained with reference to FIG. 1 to FIG. 4. FIG. 1 to FIG. 4 are explanatory diagrams that schematically show the playlist generation method according to the present embodiment.

First, FIG. 1 is referred to. The playlist generation method according to the present embodiment is achieved using a playlist generator. The playlist generation method according to the present embodiment has a technical feature in that the user specifies a "music feature" that the user wants to incorporate into a playlist, instead of the user manually selecting pieces of "music" one by one. When the "music feature" is specified, the playlist generator automatically extracts pieces of music with the specified feature and creates a playlist.

The user specifies the music feature using a parameter specifying device 101 such as that shown in FIG. 1. The parameter specifying device 101 is an input device to specify a parameter value that indicates a music feature. Note that one parameter specifying device 101 corresponds to one music feature. Therefore, when the user specifies a plurality of types of features at the same time, the user uses a plurality of the parameter specifying devices 101 as shown in FIG. 1.

Each of the parameter specifying devices 101 is provided as a graphical user interface (hereinafter referred to as the GUI) object, for example. Of course, each of the parameter specifying devices 101 may be a physical interface device. Note however that, in the explanation below, it is assumed that each of the parameter specifying devices 101 is a GUI object.

As shown in FIG. 1, each of the parameter specifying devices 101 has a parameter operation portion 1011. The parameter operation portion 1011 is an operation unit that is used to specify parameter values. The parameter operation portion 1011 may have any shape as long as it can be used to specify parameter values, and it may be a rotary knob (refer to FIG. 1), a numeric value input box (not shown in the drawings) or the like. However, in the following explanation, it is assumed that the parameter operation portion 1011 has a rotary knob shape. When the parameter operation portion 1011 is formed in such a shape, the user can freely set a parameter value by twirling the parameter operation portion 1011. As a result, an upper limit or a lower limit of the parameter value can be quickly set, and good operability is obtained.

As shown in FIG. 1, each of the parameter specifying devices 101 further includes a parameter display portion 1012. The parameter display portion 1012 is a display unit that displays a parameter value type that can be specified using the parameter specifying device 101, a parameter value that is specified using the parameter operation portion 1011, a parameter value rage that can be specified using the parameter operation portion 1011, and the like. For example, a character string indicating "music tempo" and a parameter value of "88" are displayed on the parameter display portion 1012 of the parameter specifying device 101 that is used to specify the "music tempo". Further, for example, a character string indicating "musical instrument type" and a parameter value of "P (piano)" are displayed on the parameter display portion 1012 of the parameter specifying device 101 that is used to specify the "musical instrument type".

In this manner, each of the parameter specifying devices 101 is provided with the operation unit and the display unit, and the user can use the parameter specifying device 101 corresponding to the music feature to specify the "music feature" to extract pieces of music that the user wants to incorporate into the playlist. Types of parameter values that can be specified using the parameter specifying devices 101 are shown, for example, in FIG. 3.

As an example of the types of parameter values, FIG. 3 shows tempo, a level of happiness (happy), an acoustic level (acoustic), a level of fame (major), a decade and the like. A time channel shown in FIG. 3 is used to specify a production year, and a mood channel is used to specify a mood.

Further, event information (event) is used to specify the mood of an event, and an artist name (artist) is used to specify the initial of the artist name. Note that the level of happiness (happy) indicates the level of a feeling of happiness felt by the user. The acoustic level (acoustic) indicates the percentage of the sound of an acoustic musical instrument that is not an electronic musical instrument and that produces an original musical instrument sound. Note that the types of parameter values are not limited to these examples. For example, a "cherry blossom level" that expresses a spring-like feeling, and a "celebrity level" that represents the likelihood that the music has a feeling of a celebrity group are included in the types of parameter values.

In this way, there are many types of parameter values. Among them, some of the parameter values are rarely specified by the user because they do not match the user's preference. For example, it is quite unlikely that a parameter value of the "cherry blossom level" is specified in autumn. In a similar manner, it is quite unlikely that an elderly user specifies a parameter value of the "celebrity level". In addition, if many of the parameter specifying devices 101 are presented to the user, the user takes a long time to find the parameter specifying device 101 that the user wants to use, and the appearance deteriorates. To address this, in the present embodiment, a system is proposed in which the parameter specifying devices 101 that match the user's preference and use environment etc. are presented to the user (refer to FIG. 2).

First, when the user uses the playlist generator for the first time, the user registers in advance user information, environment information and the like. Examples of the above-described user information include the user's age, gender, nationality, family structure and the like. Examples of the above-described environment information include the user's location area, current time (time zone), language of use and the like.

Figure 2:
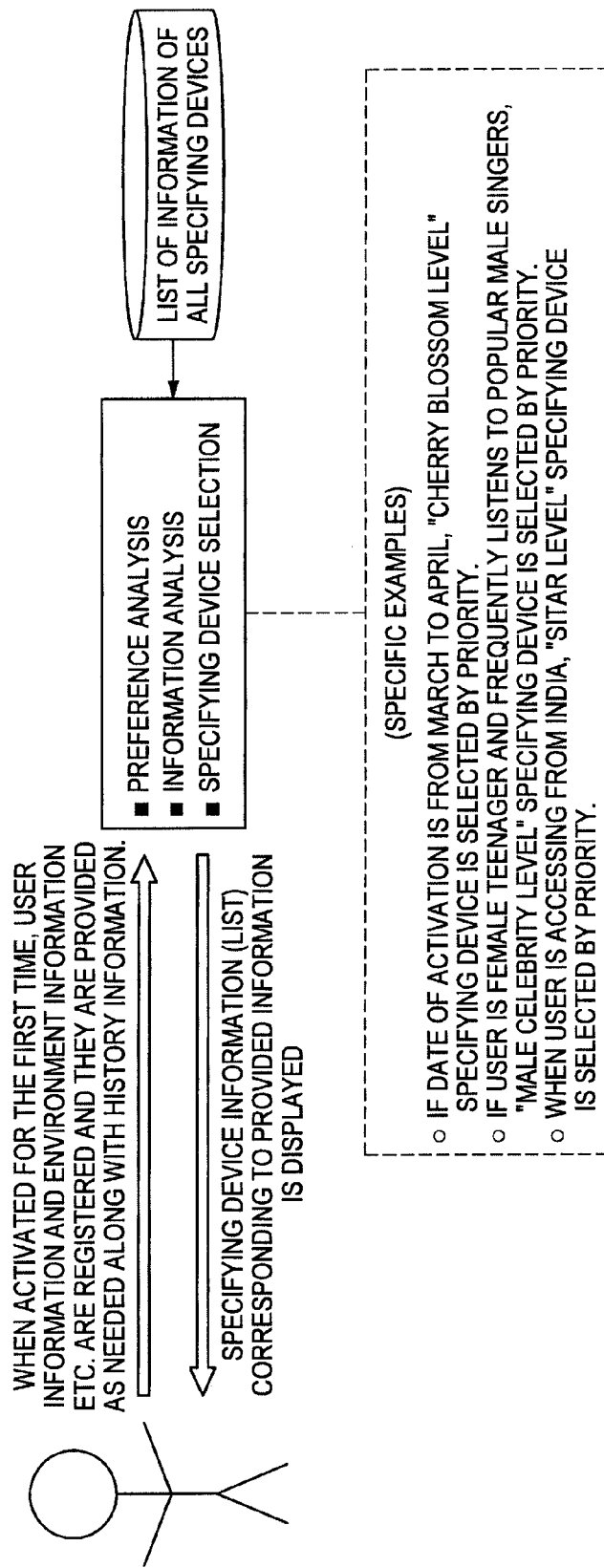
FIG. 2 is an explanatory diagram showing a method for acquiring a specifying device list according to the embodiment.

If the user has used the playlist generator in the past, history information is stored, such as operation history of the playlist generator, music playback history, music purchase history and the like. Further, preference information (including, for example, a favorite genre, a favorite artist, favorite parameter values and the like), which is obtained by analyzing the history information and the like, is held. Then, as shown in FIG. 2, the user information, the environment information and the history information are used to analyze the user's preferences and these pieces of information are analyzed, and the types of parameter values (the parameter specifying devices 101) are selected that are likely to be specified by the user.

For example, if the date when the user activates the playlist generator is in the period from March to April, it is determined (based on the environment information) that there is a high possibility that the user will specify a parameter value of the "cherry blossom level", and the parameter specifying device 101 that corresponds to the "cherry blossom level" is presented to the user. If the user is a female teenager and frequently listens to the songs of male celebrity singers, it is determined (based on the user information and the history information (the preference information)) that there is a high possibility that the user will specify a parameter value of a "male celebrity level", and the parameter specifying device 101 that corresponds to the "male celebrity level" is presented to the user. If the user accesses from India, it is determined (based on the environment information) that there is a high possibility that the user will specify a parameter value of a "sitar level", and the parameter specifying device 101 that corresponds to the "sitar level" is presented to the user.

Since the parameter specifying device 101 that corresponds to the user's preference, use environment or the like is presented to the user as described above, the user can quickly find the parameter specifying device 101 that corresponds to the parameter value that the user wants to specify. Further, since the types of parameter values are selectively reduced, it is possible to avoid a situation in which a lot of the parameter specifying devices 101 are displayed in a complicated manner and the appearance deteriorates.

Note that a system may be adopted in which a list of the parameter specifying devices 101 that are selected in accordance with the user's preference, use environment and the like is presented to the user and the user is allowed to select, from the list, the parameter specifying devices 101 that the user will use. Further, a combination of the parameter specifying devices 101 selected as a result of the preference analysis and the information analysis, a combination of the parameter values specified using each of the parameter specifying devices 101, and the like may be held as the preference information.

When the parameter values are specified using a plurality of the parameter specifying devices 101 presented in this manner, a combination of the specified parameter values is input to the playlist generator. As shown in FIG. 1, the playlist generator includes a music extraction portion 102 and a list generation portion 105. The music extraction portion 102 extracts the pieces of music that match the input combination of the parameter values (hereinafter referred to as a specified feature quantity vector). The list generation portion 105 generates a list of the pieces of music extracted by the music extraction portion 102. Note that the specified feature quantity vector can be expressed, for example, as (tempo, piano, . . . , acoustic)=(60, 10, . . . , 80).

Note that it is also possible to specify each of the parameter values by a numeric value range. For example, each of the parameter values can be specified as (tempo, piano, . . . , acoustic)=(60-70, 10-40, . . . , 80-88). When the specified feature quantity vector is input, the music extraction portion 102 refers to a feature quantity meta database 103 and extracts the pieces of music that match the input specified feature quantity vector. The feature quantity meta database 103 is a database to associate music with a combination of parameter values (hereinafter referred to as a music feature quantity vector) (refer to FIG. 7).

For example, the feature quantity meta database 103, an example of which is shown in FIG. 7, associates music identification information (Song ID) with parameter values, such as sound volume (amplitude), tempo, rhythm (cadence), chord complexity, acoustic level (acoustic), and piano level (piano). Note that, the music feature quantity vector can be expressed as (amplitude, . . . , acoustic)=(40, . . . , 80), for example.

Further, the parameter values that correspond to each piece of music can be calculated using an analysis technology described, for example, in Japanese Patent Application Publication No. JP-A-2005-274708 (hereinafter referred to as Document A) and Japanese Patent Application Publication No. JP-A-2008-123011 (hereinafter referred to as Document B). For example, Document A describes a method in which a music audio signal is frequency-analyzed, and based on an analysis result of the music audio signal, a music tempo, a sense of speed (music speed), a tempo fluctuation and the like are calculated as feature quantities (parameter values).

Further, Document B describes a method for generating a feature quantity extraction algorithm that is more general-purpose than the method described in Document A. When the method described in Document B is used, many pieces of music that have the same feature can be used as teacher data, and it is possible to automatically structure a feature quantity extraction algorithm that is used to calculate the feature quantity representing that feature. Further, when the feature quantity extraction algorithm is used, it is possible to calculate a given feature quantity (parameter value) from a given piece of music.

When the specified feature quantity vector is input, the music extraction portion 102 detects, from the feature quantity meta database 103, a music feature quantity vector that matches the specified feature quantity vector, and extracts music corresponding to the detected music feature quantity vector. If each parameter value included in the specified feature quantity vector is specified by one numeric value, for example, the music extraction portion 102 calculates an absolute value of a difference between the music feature quantity vector and the specified feature quantity vector, and detects the music feature quantity vector that satisfies the condition that the calculated absolute value of the difference is equal to or larger than a predetermined value. Note that a square of the difference may be used instead of the absolute value of the difference.

If a predetermined number or more of music feature quantity vectors that satisfy the condition that the absolute value of the difference is equal to or larger than the predetermined value are detected, the music extraction portion 102 selects the predetermined number of music feature quantity vectors in descending order of the absolute value of the difference. Then, the music extraction portion 102 extracts, from the feature quantity meta database 103, the identification information of the music corresponding to the selected music feature quantity vectors, and inputs the extracted identification information of the music into the list generation portion 105.

On the other hand, when each parameter value included in the specified feature quantity vector is specified by a numeric value range, the music extraction portion 102 detects a music feature quantity vector that satisfies the condition that each parameter value of the music feature quantity vector is included in the numeric value range of each parameter value of the specified feature quantity vector. Note however that, if a predetermined number or more of music feature quantity vectors are detected, the music extraction portion 102 presents the user with a warning to narrow down the numeric value range of each parameter value, or selects the predetermined number of music feature quantity vectors in a given manner, or in accordance with a predetermined weighting that is set for each parameter value. Then, the music extraction portion 102 extracts, from the feature quantity meta database 103, the identification information of the music corresponding to the selected music feature quantity vectors, and inputs the extracted identification information of the music into the list generation portion 105.

When the identification information of the music is input, the list generation portion 105 refers to a music basic meta database 106 and acquires basic information of the music that corresponds to the input identification information. The music basic meta database 106 is a database to associate the music identification information with the music basic information (refer to FIG. 8). The music basic information is information to be displayed on the playlist as music information.

For example, the music basic meta database 106, an example of which is shown in FIG. 8, associates the music identification information (Song ID) with the music basic information, such as music title (title), album name (album), artist name (artist) and file storage location (content file). The list generation portion 105 extracts, from the music basic meta database 106, the basic information that corresponds to the identification information of the music input by the music extraction portion 102, and lists the extracted basic information, thereby generating a playlist. The playlist generated by the list generation portion 105 is displayed on the display portion 108 as shown in FIG. 1.

Figure 4:
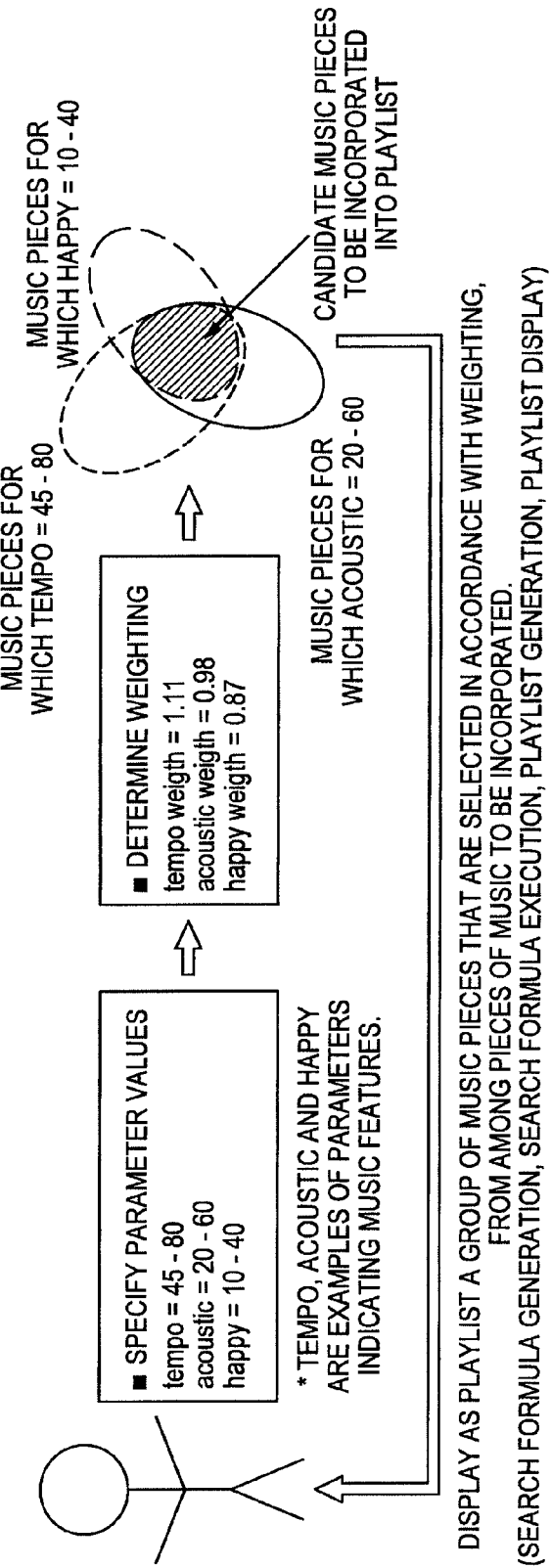
FIG. 4 is an explanatory diagram showing a playlist generation method according to the embodiment.

FIG. 4 schematically shows the playlist generation method according to the present embodiment that is briefly explained above. As shown in FIG. 4, first, a combination of parameter values (a specified feature quantity vector) is specified by the user. In the example shown in FIG. 4, the combination of parameter values (tempo, acoustic, happy)=(45-80, 20-60, 10-40) is specified. In this manner, each of the parameter values may be specified by a numeric value range. Next, the weighting of each parameter is determined in accordance with each of the specified parameter values. For example, a large weighting is determined for a parameter whose upper limit value, average value or the like is large.

Next, the identification information of the music that satisfies the condition that the music feature quantity vector matches the numeric value range of (tempo, acoustic, happy)=(45-80, 20-60, 10-40) is extracted from the feature quantity meta database 103. Note however that, when the number of the extracted pieces of music is a predetermined number or more, the pieces of music are selectively reduced according to the weighting, and the identification information of the resultant pieces of music is used to create a playlist. Then, the music basic information corresponding to the extracted music identification information is extracted from the music basic meta database 106, and the playlist is generated based on the extracted music basic information. Then, the generated playlist is displayed and presented to the user. Adoption of this type of system eliminates the operation of manually selecting music, and makes it possible to automatically generate a playlist that matches the user's preference.

The playlist generation method according to the present embodiment is briefly explained above. The feature of this method is in that the user specifies the "music feature" that the user likes, instead of specifying the "music" that the user wants to incorporate into the playlist. In other words, the feature of this method is in that the playlist that matches the user's preference is automatically generated by just specifying the mood of the music that the user wants. The use of this system makes it is possible to automatically generate the playlist that matches the mood that the user likes, from among a significant number of groups of music pieces.

Further, among different groups of music pieces, if music extraction is performed using the same specified feature quantity vector, it is possible to generate different playlists formed by music pieces with the same mood. Therefore, it is also possible to generate various playlists that correspond to the same mood from various groups of music pieces, by saving the specified feature quantity vector and reading out the specified feature quantity vector. Note that the saving of the specified feature quantity vector is achieved, for example, by saving information about the combination of the parameter specifying devices 101 and information about the parameter values specified using each of the parameter specifying devices 101.

1-2: Playlist Exchange Method

As described above, the system according to the present embodiment relates to the technology that extracts the music that matches the "music feature (mood)" from among a given group of music pieces. The above-described playlist generation method is obtained by applying this technology to playlist generation. Here, a method for applying this technology to playlist exchange will be explained. Note, however, that a target to be exchanged using this method explained here is not the playlist itself but the music feature (mood).

A method for exchanging a playlist between a user U1 and a user U2 will be explained with reference to FIG. 5. Note that it is assumed that the user U1 and the user U2 respectively use the playlist generators, which are the same as the playlist generator shown in FIG. 1. In addition, a method for transmitting the playlist from the user U1 to the user U2 will be described here, and an explanation of a method for transmitting the playlist from the user U2 to the user U1 is omitted.

First, the user U1 uses a plurality of the parameter specifying devices 101 (101-1, 101-2, 101-3) to specify parameter values. As explained above, when a combination of parameter values is specified, a playlist is generated by the playlist generator and the generated playlist is displayed. At this time, the music basic information displayed on the playlist relates to the music owned by the user U1. For example, in a case where an album name AAA, a music title Song#001, . . . , an album name ABC, a music title Song#101 and the like are stored in the music basic meta database 106 of the user U1, the basic information extracted from them is displayed on the playlist.

When a general music player is used, in order for the user U1 to share a group of music pieces collected by the same policy as the user U2, it is necessary to transmit the playlist itself from the user U1 to the user U2. However, as in the example shown in FIG. 5, when the album name AAA, the music title Song#001 and the like that are included in the playlist are not stored in the music basic meta database 106 of the user U2, the user U2 cannot listen to the pieces of music included in the playlist. In order to allow the user U2 to listen to the pieces of music included in the playlist, it is necessary for the user U1 to transmit the pieces of music to the user U2 or it is necessary for the user U2 to purchase the pieces of music included in the playlist.

On the other hand, in the playlist exchange method according to the present embodiment, the playlist itself is not transmitted to the user U2. The user U1 only transmits to the user U2 information of the parameter specifying devices 101 (hereinafter referred to as specifying device information) and the parameter values specified using each of the parameter specifying devices 101. When the user U1 transmits the specifying device information and the parameter values to the user U2, the user U2 selects the parameter specifying devices 101 based on the specifying device information received from the user U1, specifies the received parameter values, and inputs them to the playlist generator. The playlist generator extracts pieces of music based on the input combination of parameter values, and generates a playlist using the basic information extracted from the music basic meta database 106 of the user U2.

Figure 5:
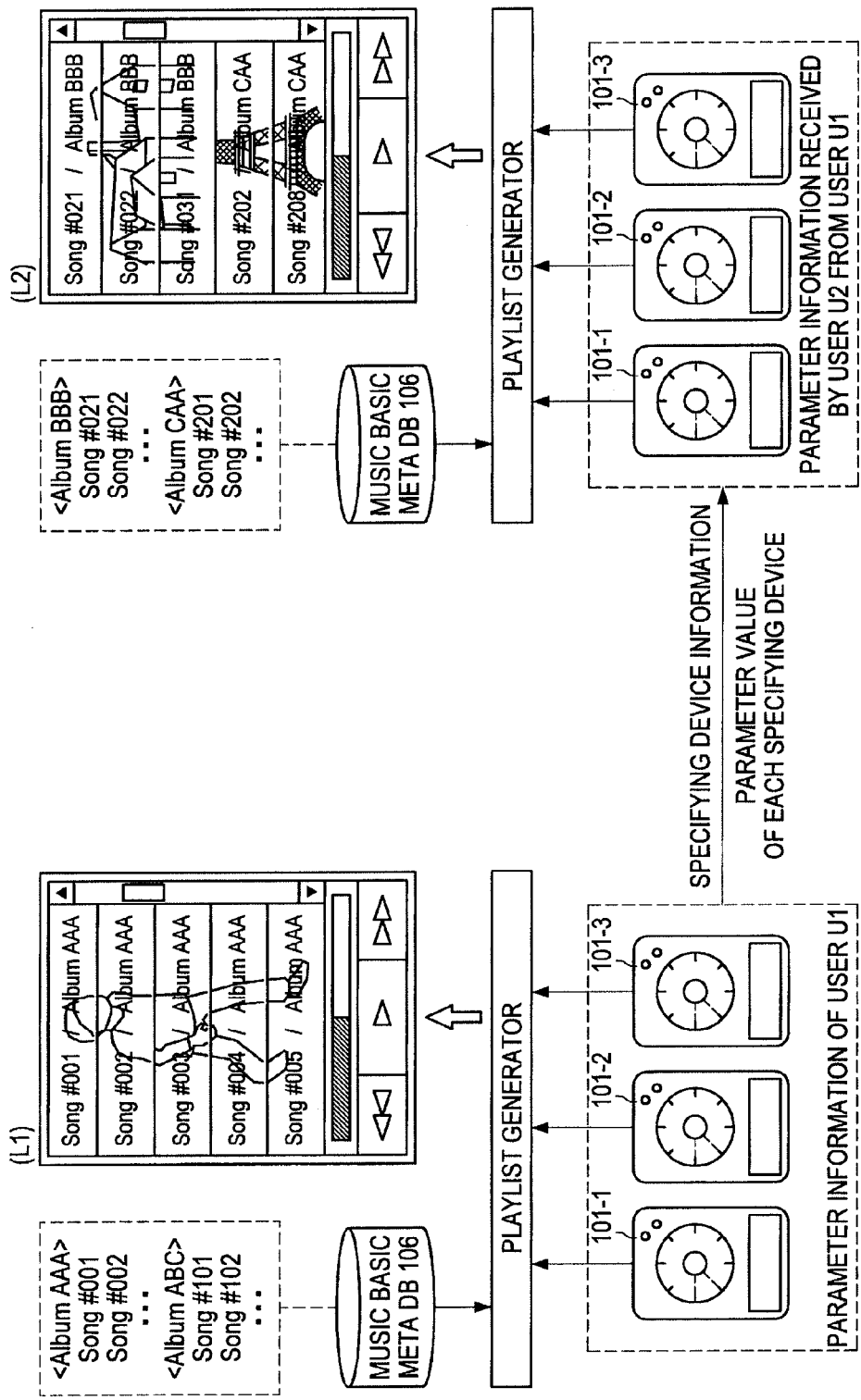
FIG. 5 is an explanatory diagram showing a playlist exchange method according to the embodiment.

As shown in FIG. 5, a playlist L1 of the user U1 and a playlist L2 of the user U2 have different contents. This is because the playlist L2 of the user U2 is generated based on the pieces of music owned by the user U2. However, since the same parameter values are used to extract music, the pieces of music included in the playlists L1 and L2 have the same feature. In other words, the users U1 and U2 can share the same mood by listening to the pieces of music included in the playlists L1 and L2 generated by them respectively. For example, in a case where a certain user wants to share a "Christmassy" mood with another person on Christmas day, the use of the method of the present embodiment makes it possible to share the "Christmassy" mood with the other person even if the other person does not own the same pieces of music as the certain user.

The playlist exchange method according to the present embodiment is briefly explained above. As described above, the playlist exchange method according to the present embodiment makes it possible to share the mood that is conveyed by the pieces of music in the playlist, rather than making it possible to share the playlist itself. More specifically, instead of exchanging the pieces of music themselves or causing another person to purchase them, the playlist exchange method according to the present embodiment makes it possible to share with the other person the "mood" that is a subjective element and that is difficult to express using words. Note that, although the playlist exchange method in which playlist exchange is performed between two users has been discussed here, it is also possible to widely disclose the specifying device information and parameter values.

1-3: Playlist Display Method

Next, the playlist display method according to the present embodiment will be explained with reference to FIG. 1 and FIG. 5. As shown in FIG. 1, the playlist is displayed on the display portion 108. Further, the playlist is displayed such that it is divided by each piece of music. Further, an image relating to the music or album, such as a jacket photo of the album, is displayed on the background of the playlist. In the example shown in FIG. 1, since a plurality of pieces of music included in the same single album are listed, a single type of jacket photo is displayed. Note that, even when a single type of jacket photo is displayed, the basic information of each piece of music is separately displayed in accordance with a frame in which the basic information of each piece of music is displayed.

On the other hand, in a case where the pieces of music extracted from two types of albums are listed, as in the playlist L2 shown in FIG. 5, the jacket photos of the respective albums are divided and displayed. In this case, in order to show an associated relationship between each album and each piece of music, in each frame in which the basic information of each piece of music is displayed, the jacket photo of the album corresponding to the piece of music is divided and displayed. For example, in the frame in which the basic information of a piece of music Song#021 included in an album BBB is displayed, a jacket photo of the album BBB is displayed in a divided manner. In a similar way, in the frame in which the basic information of a piece of music Song#202 included in an album CAA is displayed, a jacket photo of the album CAA is displayed in a divided manner.

Note that, as a method for dividing and displaying a jacket photo, a method is conceivable in which the jacket photo is displayed in accordance with a screen size of the display portion 108, and divided photos obtained by dividing the jacket photo at equal intervals are displayed in positions corresponding to the respective pieces of music. Further, if the pieces of music in the same album are arranged to be displayed without a space therebetween, the divided jacket photos are made continuous and easily viewable. In this manner, in the case of the method for dividing and displaying the jacket photo, it becomes easier to identify the jacket photo because the resolution and display size of the jacket photo can be maintained, as compared to a general method in which the jacket photo is reduced in size and displayed. This method is particularly effective when the size of each frame, in which the basic information of each piece of music is displayed, is reduced as in the case of the playlist that includes many pieces of music.

The playlist display method according to the present embodiment is briefly explained above.

As explained above, the present embodiment relates to the system that extracts music that matches the specified music feature, from a given group of music pieces. Then, by applying this system, it is possible to automatically generate a playlist, to save the mood of the music, or to share the mood of the music with another person. Hereinabove, the above-described system is roughly explained. Hereinafter, a detailed system configuration and the like to achieve this system will be explained.

2: CONFIGURATION OF PLAYLIST GENERATION SYSTEM 10

Hereinafter, the configuration of the playlist generation system 10 will be explained that can achieve the above-described system, such as the playlist generation method, the playlist exchange method and the playlist display method according to the present embodiment. As described later, the functions of the playlist generation system 10 can be achieved by using a single information processing device. Alternatively, some of the functions can be separately assigned to a plurality of information processing devices.

2-1: Overall Configuration

Figure 6:
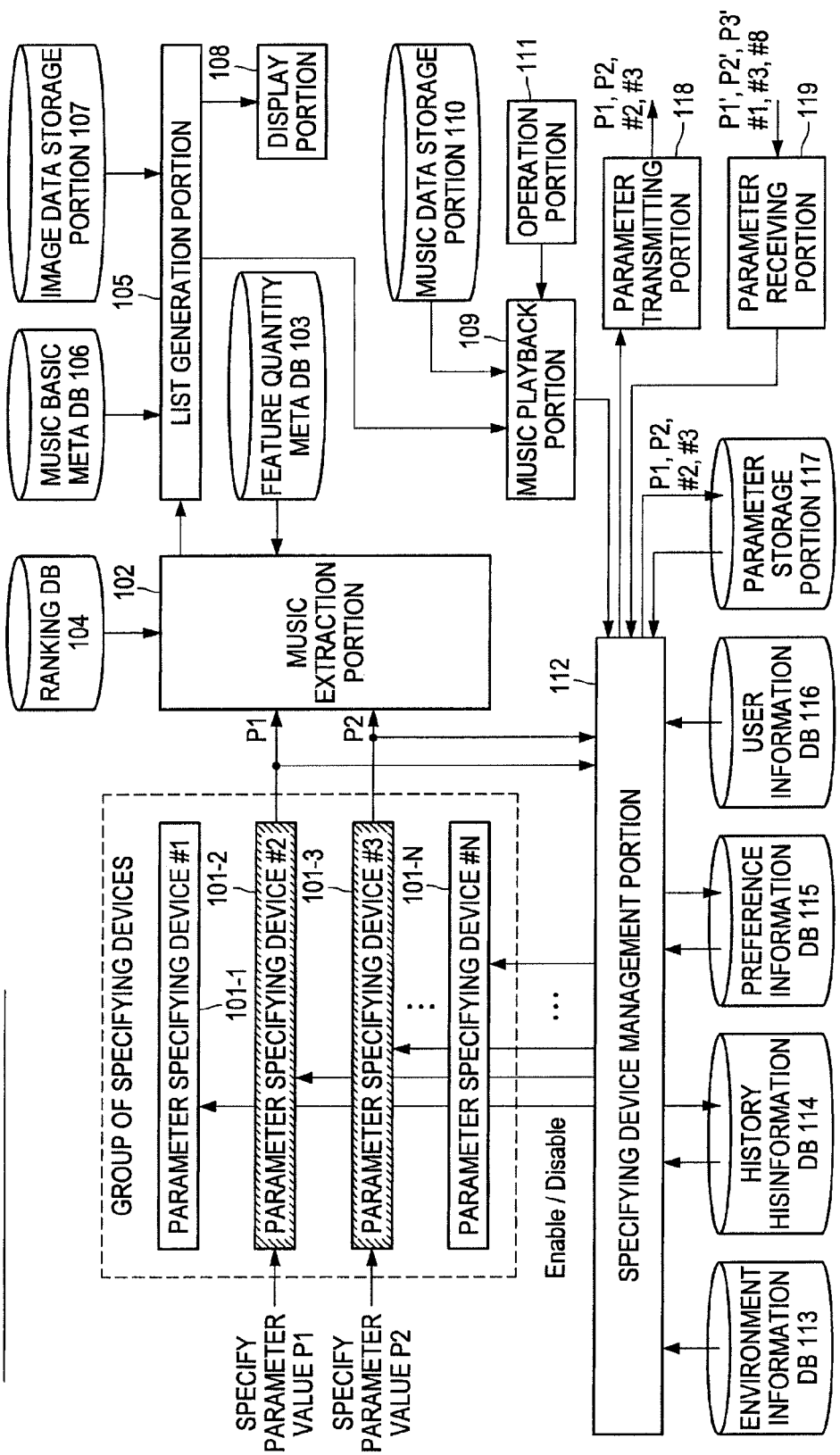
FIG. 6 is an explanatory diagram showing a configuration of a playlist generation system according to the embodiment.

First, an overall configuration of the playlist generation system 10 according to the present embodiment will be explained with reference to FIG. 6. FIG. 6 is an explanatory diagram showing the overall configuration of the playlist generation system 10 according to the present embodiment.

As shown in FIG. 6, the playlist generation system 10 includes a plurality of the parameter specifying devices 101 (101-1, . . . , 101-N), the music extraction portion 102, the feature quantity meta database 103, a ranking database 104, the list generation portion 105, the music basic meta database 106, an image data storage portion 107 and the display portion 108. Further, the playlist generation system 10 includes a music playback portion 109, a music data storage portion 110, an operation portion 111, a specifying device management portion 112, an environment information database 113, a history information database 114 and a preference information database 115. Furthermore, the playlist generation system 10 includes a user information database 116, a parameter storage portion 117, a parameter transmitting portion 118 and a parameter receiving portion 119.

First, when parameter values are specified using the parameter specifying devices 101, the specified parameter values are input to the music extraction portion 102. When the parameter values are input, the music extraction portion 102 refers to the feature quantity meta database 103 (refer to FIG. 7), extracts music that corresponds to the parameter values, and acquires the identification information of the extracted music. Note that, when features relating to ranking are specified as parameter values, the music extraction portion 102 refers to the ranking database 104 (refer to FIG. 9), extracts music that corresponds to the parameter values, and acquires the identification information of the extracted music. As shown in FIG. 9, the ranking database 104 is a database that associates music, a ranking type and ranking information (information relating to rankings) with each other.

After the identification information of the music is acquired, the music extraction portion 102 inputs the identification information of the acquired music into the list generation portion 105. When the identification information of the music is input, the list generation portion 105 refers to the music basic meta database 106 (refer to FIG. 8), and extracts the basic information that corresponds to the identification information of the input music. Then, the list generation portion 105 lists the extracted basic information and generates a playlist. At this time, the list generation portion 105 reads out an image that corresponds to the extracted basic information from the image data storage portion 107, and sets the read-out image as a background of the playlist. For example, the jacket photo of the album is stored in the image data storage portion 107, and the list generation portion 105 divides the jacket photo such that the divided jacket photos have a size appropriate for each frame of the playlist, and sets the jacket photo as the background of the playlist (refer to FIG. 1 and FIG. 5).

The playlist generated by the list generation portion 105 is displayed on the display portion 108. The identification information of the music included in the playlist is input to the music playback portion 109. The music playback portion 109 is a unit that plays back the music included in the playlist. When the identification information of the music included in the playlist is input, the music playback portion 109 reads out music data that corresponds to the input identification information from the music data storage portion 110. Further, when a playback operation is performed using the operation portion 111, the music playback portion 109 plays back the music data read out from the music data storage portion 110. Then, the music playback portion 109 inputs the identification information of the played back music into the specifying device management portion 112.

When the identification information of the music is input by the music playback portion 109, the specifying device management portion 112 records the input identification information into the history information database 114 as history information that indicates the playback history. The specifying device management portion 112 is a unit that performs control of the parameter specifying devices 101 and management of the parameter values that are input using the parameter specifying devices 101. Further, the specifying device management portion 112 holds information indicating the type of each of the parameter specifying devices 101, and information indicating the upper limit and the lower limit of the parameter value that can be specified using each of the parameter specifying devices 101.

First, the specifying device management portion 112 selects a combination of the parameter specifying devices 101 that are brought into an operable state. At this time, the specifying device management portion 112 selects a combination of the parameter specifying devices 101 that matches the user's preference, based on the environment information, the history information, the preference information and the user information. The above-described environment information is stored in the environment information database 113. The above-described history information is stored in the history information database 114. The above-described preference information is stored in the preference information database 115. Further, the above-described user information is stored in the user information database 116.

The specifying device management portion 112 reads out these pieces of information from the environment information database 113, the history information database 114, the preference information database 115 and the user information database 116, as appropriate, and uses the read-out pieces of information. Note that the above-described preference information is generated by the specifying device management portion 112 based on the history information, the user information and the like, and is stored in the preference information database 115.

For example, in the example shown in FIG. 6, the parameter specifying devices 101-2 and 101-3 are selected. Note that the parameter specifying devices 101 selected by the specifying device management portion 112 are displayed in a format shown in FIG. 11, for example, and are presented to the user. The user selects and uses some of the parameter specifying devices 101 from the list of the presented parameter specifying devices 101. The information (the specifying device information) indicating the types of the parameter specifying devices 101 that have been selected in this manner is recorded in the parameter storage portion 117 by the specifying device management portion 112. Further, the parameter values that have been input using the parameter specifying devices 101 are input to the music extraction portion 102 and also input to the specifying device management portion 112. When the parameter values are input, the specifying device management portion 112 associates the input parameter values with the specifying device information and records them in the parameter storage portion 117.

Since the specifying device information and the parameter values are stored in this manner, if the user wants to extract a group of music pieces having the same mood as the group of music pieces in the playlist generated in the past, the user can extract a desired group of music pieces by reading out the specifying device information and the parameter values from the parameter storage portion 117. At this time, the specifying device management portion 112 reads out the specifying device information and the parameter values recorded in the parameter storage portion 117 and inputs them into the music extraction portion 102. When the specifying device information and the parameter values are input into the music extraction portion 102, a playlist that corresponds to the combination of the input parameter values is generated by the music extraction portion 102, the list generation portion 105 and the like.

When the specifying device information and the parameter values are transmitted to another person, the specifying device management portion 112 inputs the specifying device information and the parameter values into the parameter transmitting portion 118. When the specifying device information and the parameter values are input, the parameter transmitting portion 118 transmits the input specifying device information and the parameter values to the other person (to the playlist generation system 10 used by the other person). Note that the parameter transmitting portion 118 may be structured such that it discloses the specifying device information and the parameter values, and when the parameter transmitting portion 118 receives a transmission request of the specifying device information and the parameter values from the other person, it transmits the specifying device information and the parameter values.

On the other hand, the parameter receiving portion 119 can receive the specifying device information and the parameter values transmitted from another person. When the parameter receiving portion 119 receives the specifying device information and the parameter values, the parameter receiving portion 119 inputs the received specifying device information and parameter values into the specifying device management portion 112. When the specifying device information and the parameter values are input, the specifying device management portion 112 inputs the input specifying device information and parameter values into the music extraction portion 102, or it records them in the parameter storage portion 117. When the specifying device information and the parameter values are input to the music extraction portion 102, a playlist composed of a group of music pieces having a mood that the other person likes is generated by the functions of the music extraction portion 102, the list generation portion 105 and the like.

As explained above, the use of the playlist generation system 10 shown in FIG. 6 makes it possible to achieve the playlist generation method, the playlist exchange method and the playlist display method according to the present embodiment that have been explained earlier.

2-2: Configuration of Specifying Device Management Portion 112

Figure 10:
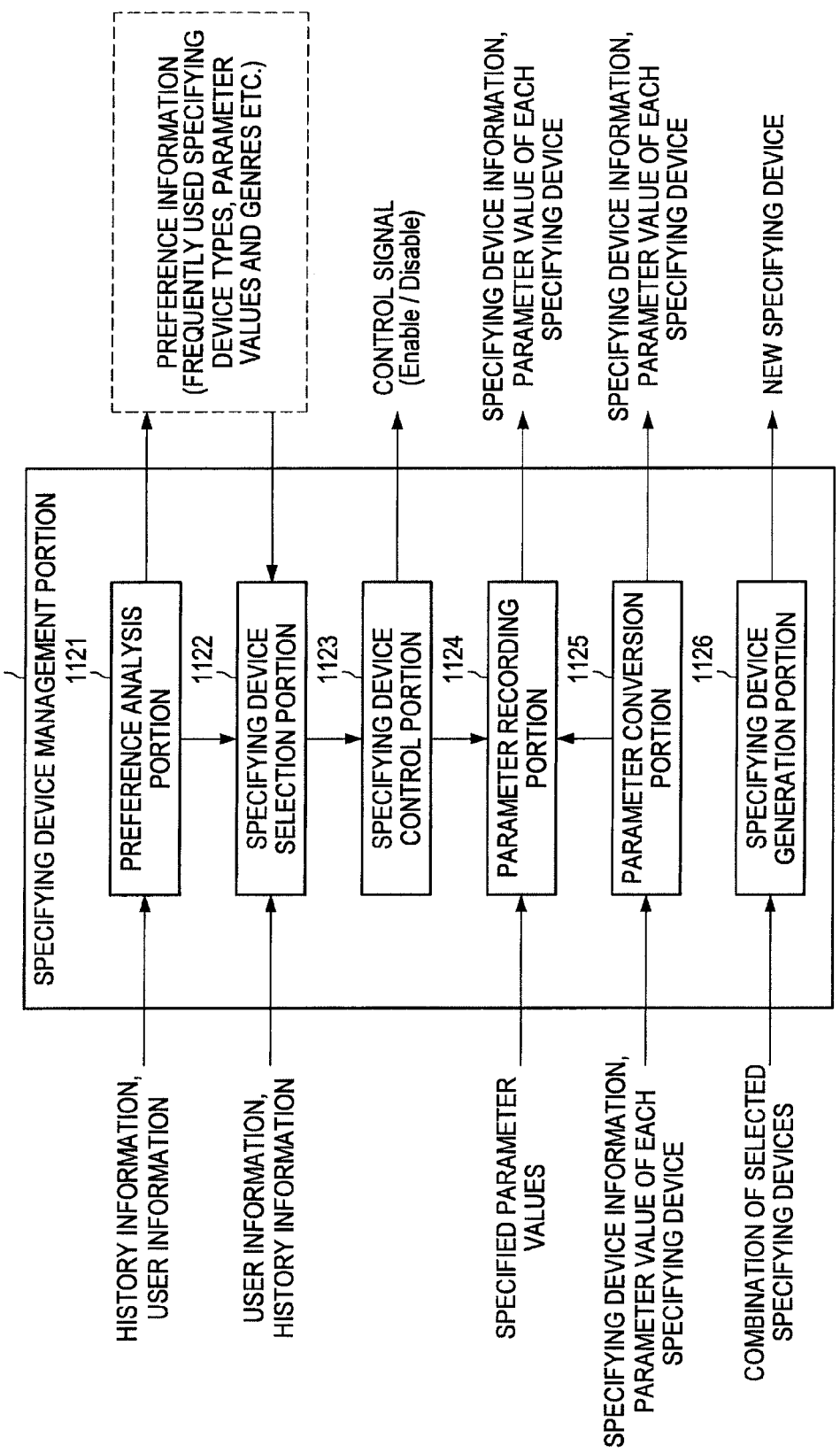
FIG. 10 is an explanatory diagram showing a detailed configuration of a specifying device management portion according to the embodiment.

The overall configuration of the playlist generation system 10 is explained above. Here, the function of the specifying device management portion 112 included in the playlist generation system 10 will be explained in more detail with reference to FIG. 10. FIG. 10 is an explanatory diagram that illustrates a detailed functional configuration of the specifying device management portion 112.

As shown in FIG. 10, the specifying device management portion 112 mainly includes a preference analysis portion 1121, a specifying device selection portion 1122, a specifying device control portion 1123, a parameter recording portion 1124, a parameter exchange portion 1125 and a specifying device generation portion 1126.

The preference analysis portion 1121 is a unit that breaks down or analyzes the user information and the history information and calculates the preference information. For example, the preference analysis portion 1121 refers to the playback history, the purchase history and the like included in the history information, and statistically detects artists etc. that the user likes. Further, the preference analysis portion 1121 refers to age and gender etc. included in the user information, and predicts music of an era that the user likes, and the like. Further, from the preference information that has been detected or predicted in this manner, the preference analysis portion 1121 estimates the types of the parameter specifying devices 101 that are predicted to be used frequently, a parameter value range having a high possibility of being specified, and the like, and records them in the preference information database 115. Furthermore, the preference analysis portion 1121 inputs the preference information that has been detected, predicted or estimated in this manner, into the specifying device selection portion 1122.

When the preference information is input from the preference analysis portion 1121, the specifying device selection portion 1122 selects the types of the parameter specifying devices 101 to be presented to the user, based on the environment information, the history information, the preference information and the user information. The specifying device information of the parameter specifying devices 101 selected by the specifying device selection portion 1122 is input to the specifying device control portion 1123. When the specifying device information is input, the specifying device control portion 1123 causes the parameter specifying devices 101 corresponding to the input specifying device information to be in an operable state. For example, the specifying device control portion 1123 displays the parameter specifying devices 101 corresponding to the input specifying device information (refer to FIG. 11), or clearly shows that the parameter specifying devices 101 are in an operable state by highlight display.

Further, the specifying device control portion 1123 inputs into the parameter recording portion 1124 the specifying device information of the parameter specifying devices 101 that are caused to be in an operable state. In addition to the specifying device information input from the specifying device control portion 1123, the parameter values specified using the parameter specifying devices 101 that are caused to be in an operable state are input into the parameter recording portion 1124. When the specifying device information and the parameter values are input, the parameter recording portion 1124 associates the input specifying device information and parameter values with each other, and records them in the parameter storage portion 117. For example, the parameter recording portion 1124 records, in the parameter storage portion 117, that a combination of a parameter specifying device #2 and a parameter specifying device #3 is used (specifying device information) and that the parameter value of the parameter specifying device #2 is P1 and the parameter value of the parameter specifying device #3 is P2.

Figure 12:
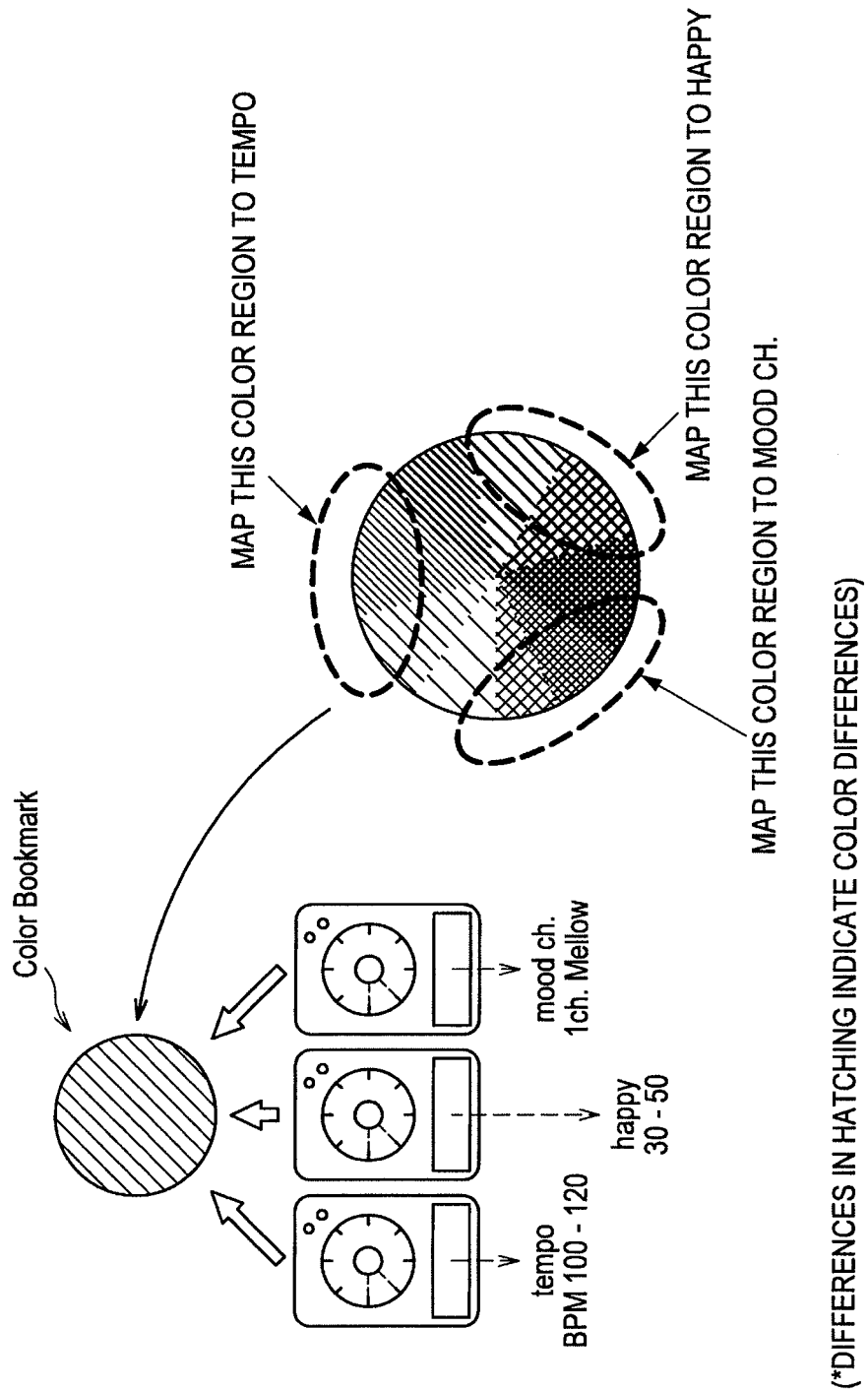
FIG. 12 is an explanatory diagram showing a playlist storage method according to the embodiment.

Note that the parameter recording portion 1124 may be structured such that it uses colors to record the specifying device information and the parameter values, as shown in FIG. 12. As a method for recording the specifying device information and the parameter values, for example, a method is conceivable in which a color map is prepared in which a music feature is assigned to each color region as shown in FIG. 12, and colors corresponding to the specifying device information and the parameter values are recorded. In the example shown in FIG. 12, "tempo", "happy" and "mood channel" are assigned to three color regions in the color map. In this case, when the parameter values are specified using the parameter specifying devices 101 that respectively correspond to "tempo", "happy" and "mood channel", a color in the color map is selected in accordance with the specified parameter values, and the selected color is recorded as a color bookmark.

Figure 11:
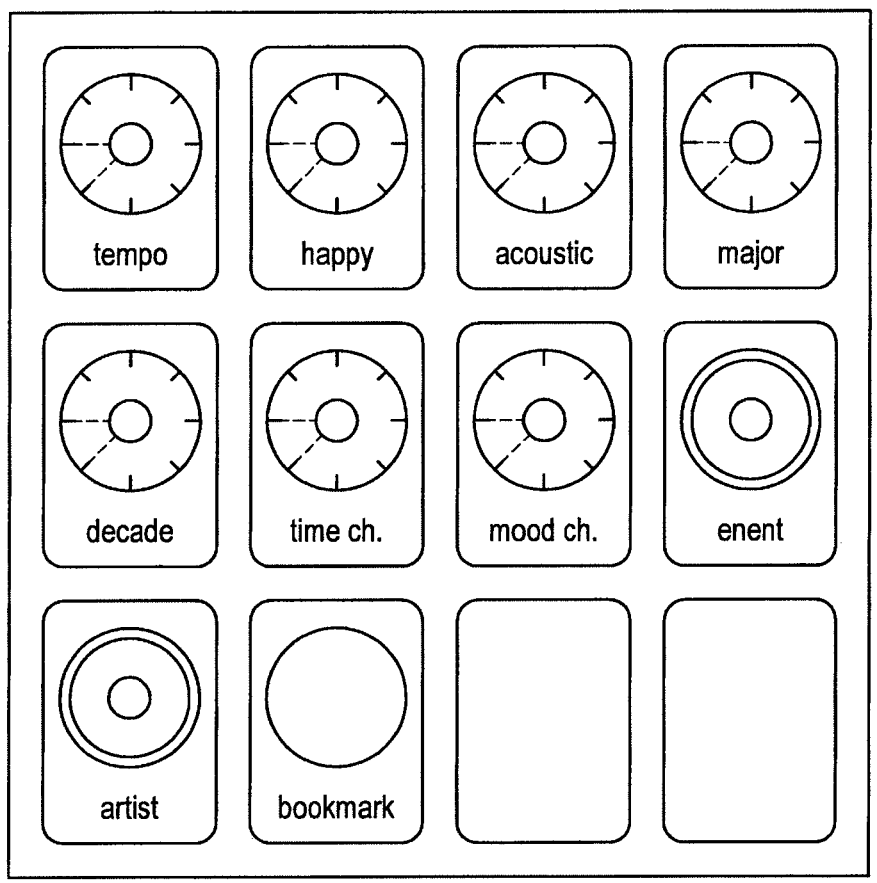
FIG. 11 is an explanatory diagram showing a method for displaying a specifying device list according to the embodiment.

Since the combination of the specifying device information and the parameter values is expressed using color in this manner, it is possible to express multi-dimensional information using a chromaticity point in the color map. Note that, as shown in FIG. 11, a GUI object (bookmark) of a color that corresponds to the recorded specifying device information and parameter values may be displayed in the list of GUI objects that indicate the parameter specifying devices 101. With this type of display, the user can quickly call up the recorded specifying device information and parameter values. In addition, since color is used to express the specifying device information and the parameter values, the mood of the group of music pieces included in the playlist is expressed by color. Therefore, the user can intuitively recall the mood of the group of music pieces expressed by the specifying device information and the parameter values that have been recorded in the past.

The parameter exchange portion 1125 is a unit that transmits the specifying device information and the parameter values to another person via the parameter transmitting portion 118, or receives the parameter specifying device information and the parameter values from the other person via the parameter receiving portion 119. When the specifying device information and the parameter values are transmitted to the other person, the parameter exchange portion 1125 inputs the specifying device information and the parameter values into the parameter transmitting portion 118. On the other hand, when the specifying device information and the parameter values are received from the other person, the parameter exchange portion 1125 acquires the specifying device information and the parameter values from the parameter receiving portion 119, and inputs them into the music extraction portion 102 or records them in the parameter recording portion 1124.

Figure 13:
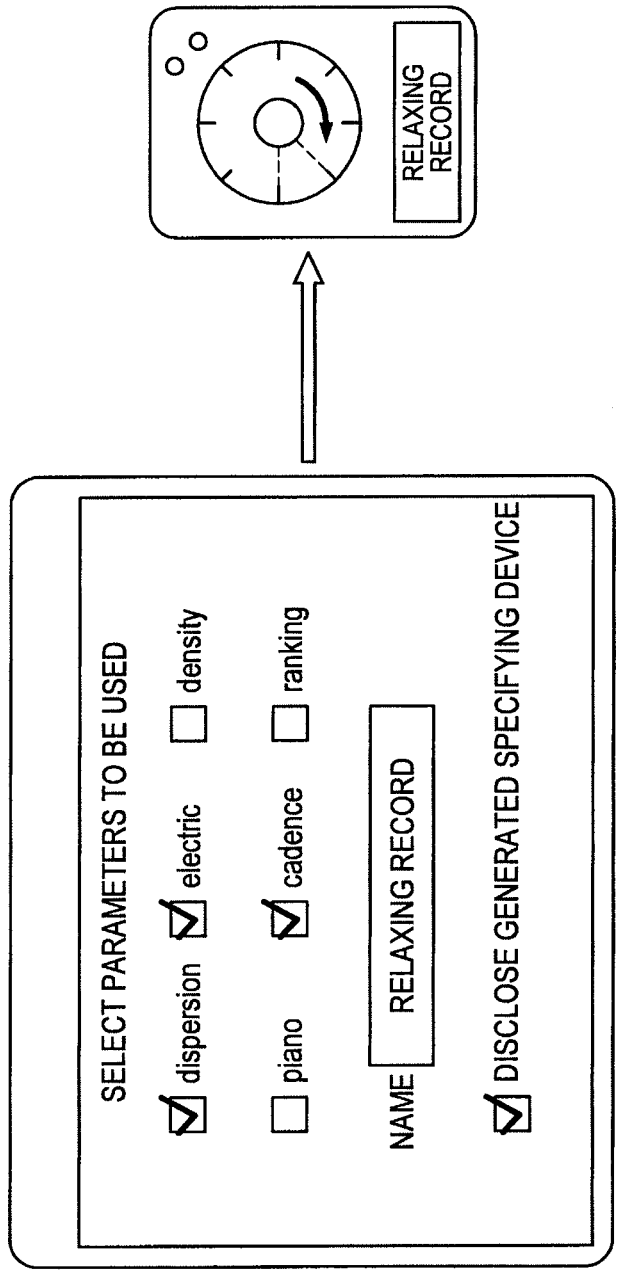
FIG. 13 is an explanatory diagram showing a specifying device addition method according to the embodiment.

The specifying device generation portion 1126 is a unit that generates a new type of the parameter specifying device 101 by combining existing parameters. When the new type of the parameter specifying device 101 is generated, first, as shown in FIG. 13, the specifying device generation portion 1126 allows the user to select, from among the existing parameters, parameters to be used to generate the new parameter specifying device 101. Further, the specifying device generation portion 1126 allows the user to input the name of the new parameter specifying device 101. Further, the specifying device generation portion 1126 allows the user to select whether or not to disclose the new parameter specifying device 101.

When the user selects the parameters to be used (Step 1), the specifying device generation portion 1126 normalizes a vector of the selected parameters and converts the vector to a scalar quantity from 0 to 100 (Step 2). Most of the parameter values are not necessarily defined in the range of 0 to 100. Further, since a combination of the parameter values is a vector quantity, it is necessary to convert it to a scalar quantity so that the combination of the parameter values can be specified using the parameter specifying device 101. For example, if two types of parameters (parameter values x1, x2) are selected, the specifying device generation portion 1126 generates a conversion algorithm F that converts a vector quantity (x1, x2) to a scalar quantity p (p=0-100).

For example, the simplest conversion algorithm F is as follows: p=100*x1/x1max (where x1max is the maximum value of x1), p=100*x2/x2max (where x2max is the maximum value of x2). When this conversion algorithm F is used, if the scalar quantity p (p=0-100) is given, the vector quantity (x1, x2) is uniquely determined. It is needless to mention that the conversion algorithm F may be generated in any given way as long as the vector quantity (x1, x2) is uniquely determined when the scalar quantity p (p=0-100) is given. This also applies when three or more parameters are selected.

After the conversion algorithm F that converts the vector quantity to the scalar quantity has been determined in this manner, the specifying device generation portion 1126 registers the new parameter specifying device 101 that has the specified name and has a parameter value, which is the scalar quantity obtained from the conversion algorithm F generated at Step 2 (Step 3). For example, the specifying device generation portion 1126 makes it possible to display the new parameter specifying device 101 on the list of the parameter specifying devices 101 shown in FIG. 11. Then, the specifying device generation portion 1126 holds information of the newly registered parameter specifying device 101 (Step 4).

Hereinabove, the functional configuration of the specifying device management portion 112 is explained in detail. As described above, the specifying device management portion 112 has the function that selects the parameter specifying devices 101 to be presented to the user, based on the user's preference etc., and controls display etc. of the parameter specifying devices 101. Further, the specifying device management portion 112 has the function that records the combination of the parameter specifying devices 101 presented to the user and the parameter values specified using the parameter specifying devices 101, or transmits and receives such information to and from another person. With these functions, it is possible to hold the mood of the group of music pieces registered in the playlist or to share it with the other person. Furthermore, the specifying device management portion 112 has the function that newly generates the parameter specifying device 101. With this function, it is possible to specify a new music feature as a parameter value.

2-3: System Configuration Examples

The functional configuration of the playlist generation system 10 is explained above. Here, a system configuration when the playlist generation system 10 is actually operated will be briefly described.

Local Type

The functions of the playlist generation system 10 described above can be achieved by a single information processing device, for example. More specifically, the functions assigned to the parameter specifying device 101, the music extraction portion 102, the specifying device management portion 112 and the like, namely, parameter value specification, music extraction, playlist generation, transmission/reception and recording of the specifying device information and parameter values, and the like can be achieved by a single information processing device. In addition, if an information processing device with a high computation power is used, it may also possible to calculate the information that is to be stored in the feature quantity meta database 103 or the preference information database 115. On the other hand, if an information processing device with a low computation power is used, it may be desirable to use the feature quantity meta database 103 and the preference information database 115 that have been structured in advance.

Further, if an information processing device that is connected to a network is used, it is also possible to configure a system in which various types of databases are provided in a server device on the network, and the databases provided in the server device are used as necessary. This system may be appropriate for a terminal device that has not a large storage capacity, but is equipped with a communication function, such as a mobile phone. In any one of the above-described cases, a system configuration is possible that achieves the functions of at least the parameter specifying device 101, the music extraction portion 102, the list generation portion 105, the music playback portion 109 and the specifying device management portion 112, using a single information processing device (this system configuration is hereinafter referred to as a local type).

Server-Client Type

Figure 14:
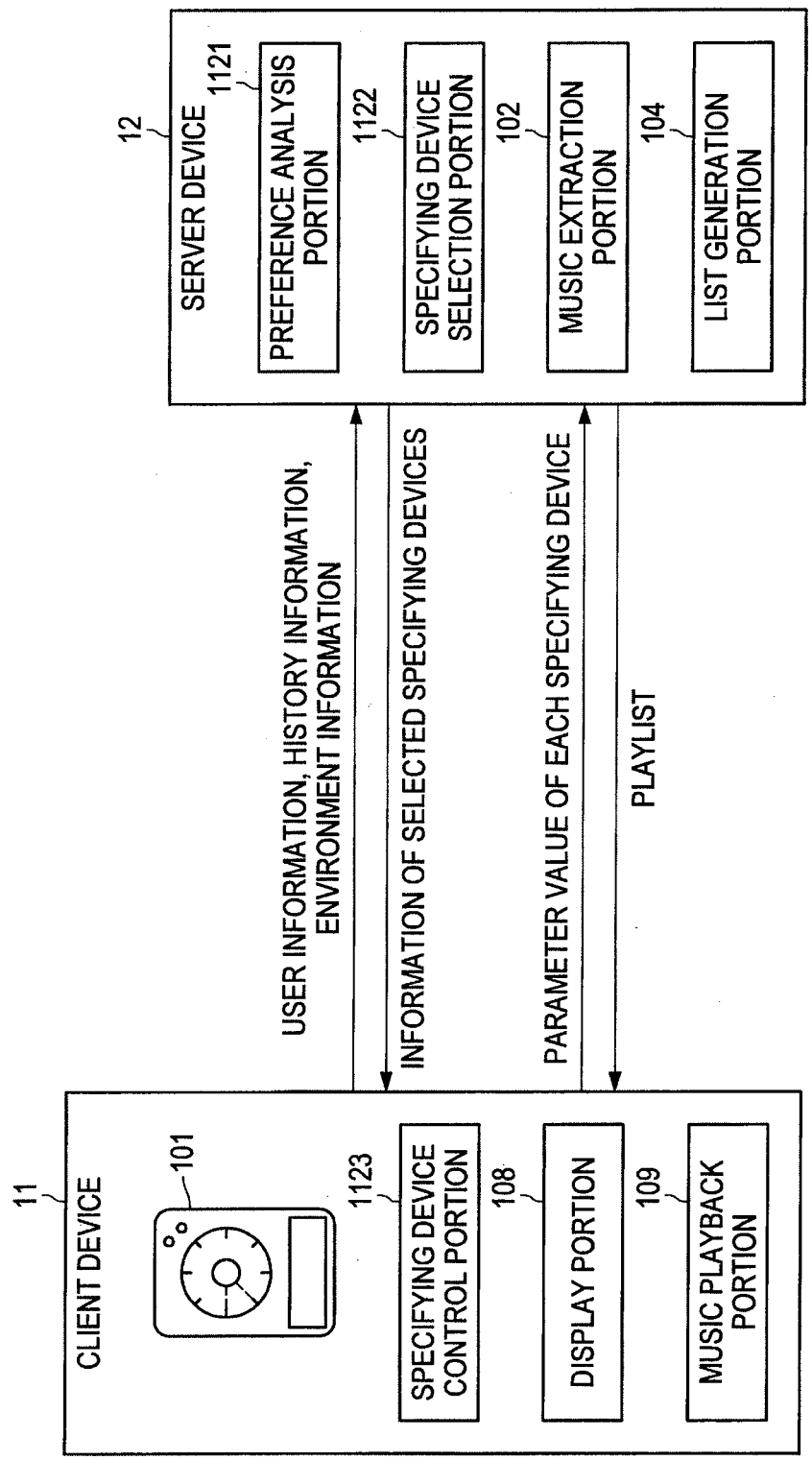
FIG. 14 is an explanatory diagram showing an example of a system configuration of the playlist generation system according to the embodiment.

It is considered that the above-described local type is appropriate for music management of an individual user. On the other hand, it is considered that a server-client type system configuration such as that shown in FIG. 14 is more appropriate for a music seller or a download provider. This system configuration includes the client device 11 and the server device 12 as shown in FIG. 14. The client device 11 is a device under control of the user. On the other hand, the server device 12 is a device under control of the music seller or the like. Of course, the server device 12 may be under control of the individual user.

When this system configuration is used, the client device 11 is mainly provided with the functions of the specifying device control portion 1123, the display portion 108 and the music playback portion 109. On the other hand, the server device 12 is mainly provided with the functions of the preference analysis portion 1121, the specifying device selection portion 1122, the music extraction portion 102 and the list generation portion 105. More specifically, the client device 11 is a unit that displays the parameter specifying devices 101 or actually plays back music, while the server device 12 is a unit that presents the specifying device information to the client device 11, or provides a playlist.

Figure 15:
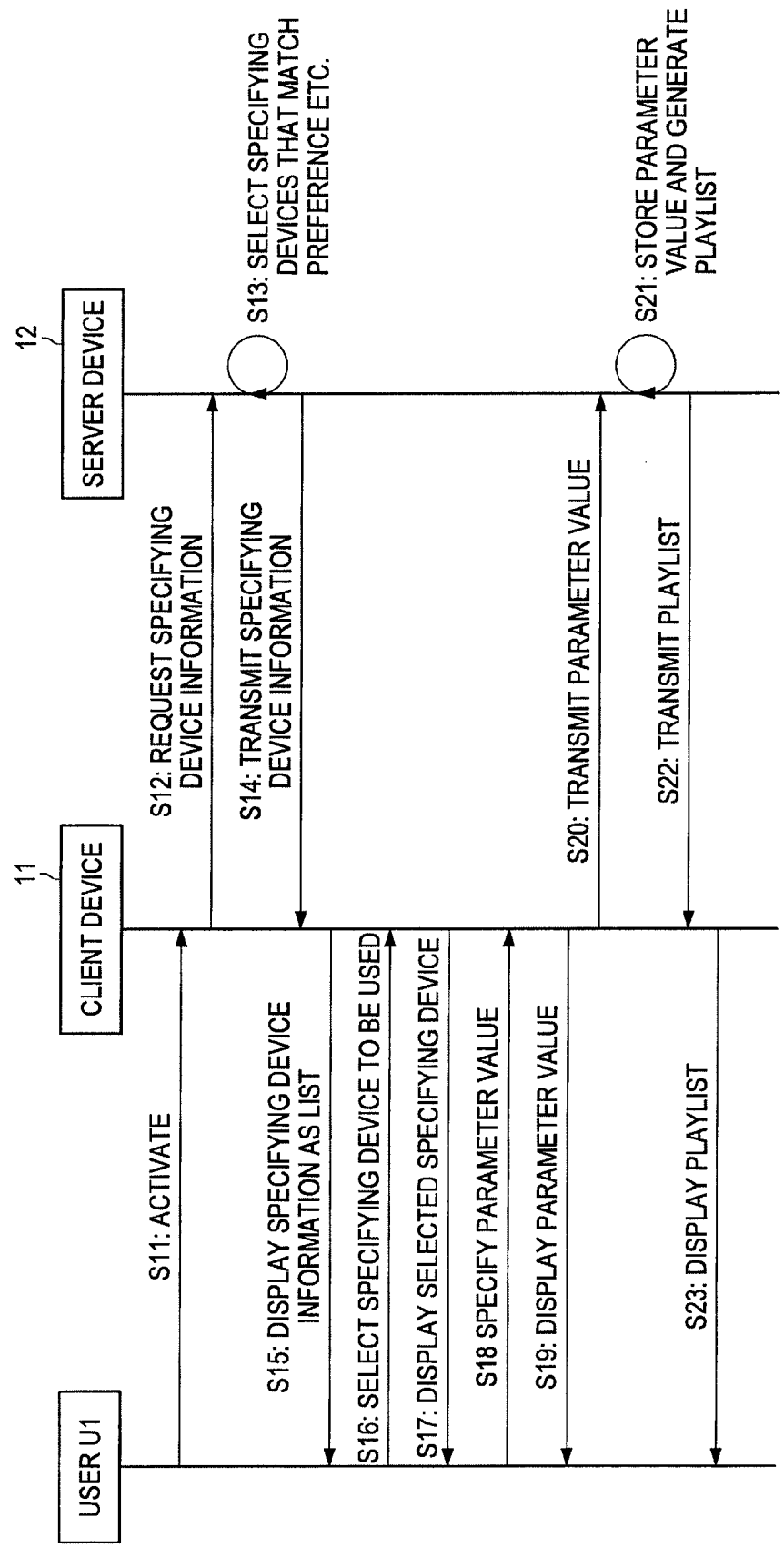
FIG. 15 is an explanatory diagram showing an example of a playlist generation procedure according to the embodiment.

Operations of the client device 11 and the server device 12 will now be explained with reference to FIG. 15. FIG. 15 is an explanatory diagram that illustrates the operations of the client device 11 and the server device 12.

As shown in FIG. 15, first, the user operates the client device 11 and activates a parameter value specifying function performed by the parameter specifying devices 101 (S11). Then, the client device 11 requests the server device 12 to transmit the specifying device information of the parameter specifying devices 101 (S12). At this time, the client device 11 transmits, to the server device 12, the environment information (language of use, district, time zone and the like), the history information (operation history, purchase history, playback history and the like) and the user information (age, gender, nationality, family structure and the like). Next, the server device 12 selects the types of the parameter specifying devices 101 that match the user's preference and the like, which are obtained by breaking down or analyzing the environment information, the history information and the user information received from the client device 11 (S13).

Next, the server device 12 transmits to the client device 11 the specifying device information that indicates a combination of the selected parameter specifying devices 101 (S14). Then, the client device 11 receives the specifying device information from the server device 12, and displays a list of the parameter specifying devices 101 that correspond to the received specifying device information (S15). Then, the user selects the parameter specifying device 101 to be used, from the list of the parameter specifying devices 101 (S16).

Next, the client device 11 displays the parameter specifying device 101 selected by the user (S17). Then, the user specifies a parameter value using the parameter specifying device 101 displayed on the client device 11 (S18). Then, the client device 11 displays the parameter value specified by the user (S19), and transmits the parameter value to the server device 12 (S20).

Next, the server device 12 records the parameter value received from the client device 11, and generates a playlist based on the received parameter value (S21). At this time, the server device 12 uses the functions of the music extraction portion 102 and the list generation portion 105 to extract a group of music pieces that match the parameter value and to generate the playlist. Then, the server device 12 transmits the playlist generated at S21 to the client device 11 (S22). Then, the client device 11 displays the playlist received from the server device 12 (S23).

In this manner, the processing relating to the user's preference analysis and the selection of the parameter specifying device 101, and the music extraction processing based on the specified parameter value are performed by the server device 12. Thus, even when the computing power of the client device 11 is low or the storage capacity of the client device 11 is small, it is possible to achieve the functions of the playlist generation system 10. Further, by applying this system configuration, it is possible to obtain, without listening to music at all, a playlist of the pieces of music that match the preference of the individual user (the client device 11) from a huge amount of music that the music seller or the like (the server device 12) holds.

The system configuration examples of the playlist generation system 10 are described above.

3: HARDWARE CONFIGURATION

Figure 16:
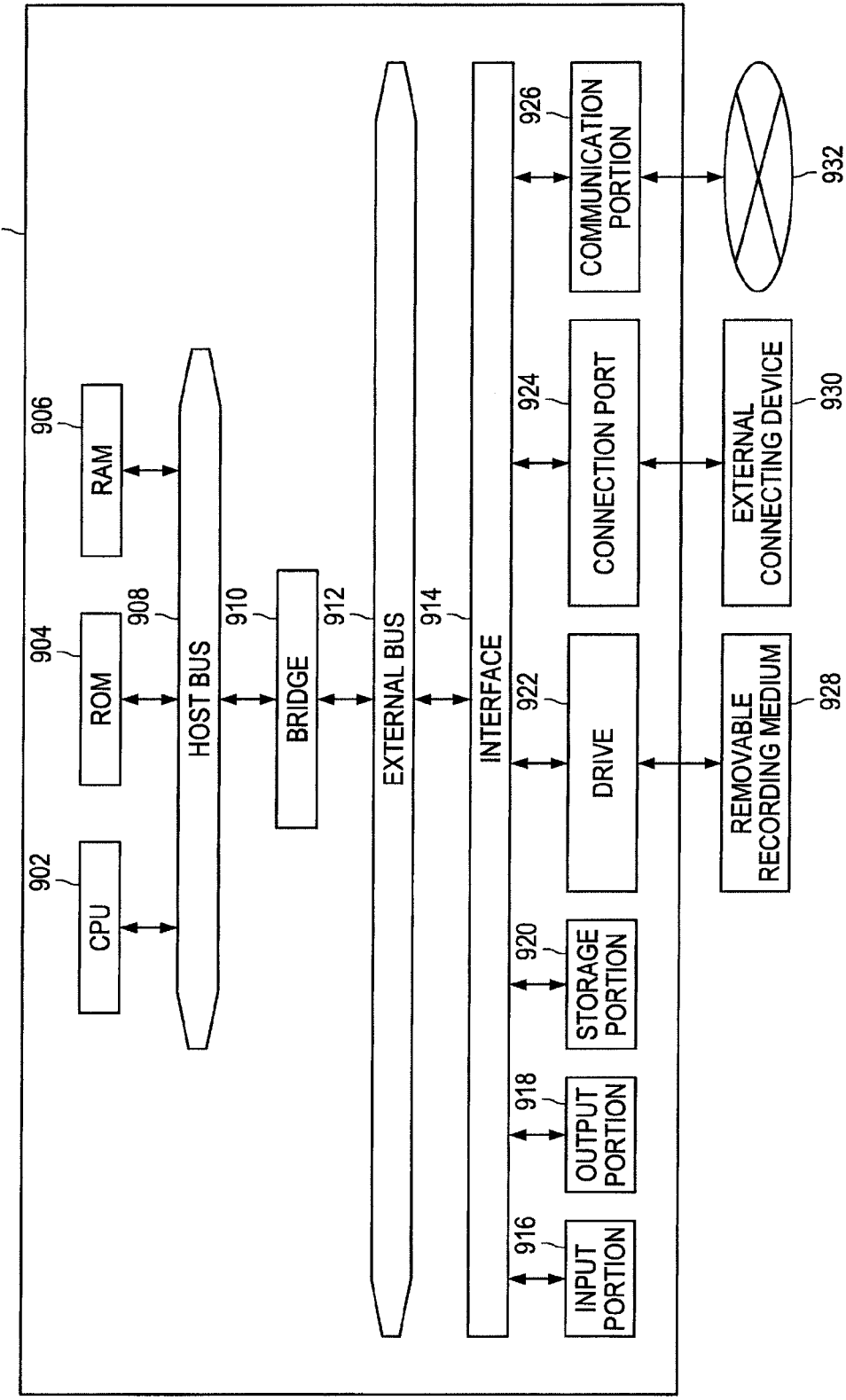
FIG. 16 is an explanatory diagram showing an example of a hardware configuration that is capable of achieving functions of the playlist generation system, a server device and a client device according to the embodiment.

The functions of the playlist generation system 10, the client device 11, the server device 12, or the like described above can be realized by using the hardware configuration of an information processing apparatus shown in FIG. 16, for example. That is, the function of each structural element is realized by controlling the hardware shown in FIG. 16 by using a computer program. Additionally, the mode of this hardware is arbitrary, and may be a personal computer, a mobile information terminal such as a mobile phone, a PHS or a PDA, a game machine, or various types of information appliances. Moreover, the PHS is an abbreviation for Personal Handy-phone System. Also, the PDA is an abbreviation for Personal Digital Assistant.

As shown in FIG. 16, this hardware mainly includes a CPU 902, a ROM 904, a RAM 906, a host bus 908, and a bridge 910. Furthermore, this hardware includes an external bus 912, an interface 914, an input unit 916, an output unit 918, a storage unit 920, a drive 922, a connection port 924, and a communication unit 926. Moreover, the CPU is an abbreviation for Central Processing Unit. Also, the ROM is an abbreviation for Read Only Memory. Furthermore, the RAM is an abbreviation for Random Access Memory.

The CPU 902 functions as an arithmetic processing unit or a control unit, for example, and controls an entire operation or a part of the operation of each structural element based on various programs recorded on the ROM 904, the RAM 906, the storage unit 920, or a removable recording medium 928. The ROM 904 is means for storing, for example, a program to be loaded on the CPU 902 or data or the like used in an arithmetic operation. The RAM 906 temporarily or perpetually stores, for example, a program to be loaded on the CPU 902 or various parameters or the like arbitrarily changed in execution of the program.

These structural elements are connected to each other by, for example, the host bus 908 capable of performing high-speed data transmission. For its part, the host bus 908 is connected through the bridge 910 to the external bus 912 whose data transmission speed is relatively low, for example. Furthermore, the input unit 916 is, for example, a mouse, a keyboard, a touch panel, a button, a switch, or a lever. Also, the input unit 916 may be a remote control that can transmit a control signal by using an infrared ray or other radio waves.

The output unit 918 is, for example, a display device such as a CRT, an LCD, a PDP or an ELD, an audio output device such as a speaker or headphones, a printer, a mobile phone, or a facsimile, that can visually or auditorily notify a user of acquired information. Moreover, the CRT is an abbreviation for Cathode Ray Tube. The LCD is an abbreviation for Liquid Crystal Display. The PDP is an abbreviation for Plasma Display Panel. Also, the ELD is an abbreviation for Electro-Luminescence Display.

The storage unit 920 is a device for storing various data. The storage unit 920 is, for example, a magnetic storage device such as a hard disk drive (HDD), a semiconductor storage device, an optical storage device, or a magneto-optical storage device. The HDD is an abbreviation for Hard Disk Drive.

The drive 922 is a device that reads information recorded on the removal recording medium 928 such as a magnetic disk, an optical disk, a magneto-optical disk, or a semiconductor memory, or writes information in the removal recording medium 928. The removal recording medium 928 is, for example, a DVD medium, a Blu-ray medium, an HD-DVD medium, various types of semiconductor storage media, or the like. Of course, the removal recording medium 928 may be, for example, an IC card on which a non-contact IC chip is mounted or an electronic device. The IC is an abbreviation for Integrated Circuit.

The connection port 924 is a port such as an USB port, an IEEE1394 port, a SCSI, an RS-232C port, or a port for connecting an externally connected device 930 such as an optical audio terminal. The externally connected device 930 is, for example, a printer, a mobile music player, a digital camera, a digital video camera, or an IC recorder. Moreover, the USB is an abbreviation for Universal Serial Bus. Also, the SCSI is an abbreviation for Small Computer System Interface.

The communication unit 926 is a communication device to be connected to a network 932, and is, for example, a communication card for a wired or wireless LAN, Bluetooth (registered trademark), or WUSB, an optical communication router, an ADSL router, or various communication modems. The network 932 connected to the communication unit 926 is configured from a wire-connected or wirelessly connected network, and is the Internet, a home-use LAN, infrared communication, visible light communication, broadcasting, or satellite communication, for example. Moreover, the LAN is an abbreviation for Local Area Network. Also, the WUSB is an abbreviation for Wireless USB. Furthermore, the ADSL is an abbreviation for Asymmetric Digital Subscriber Line.

4. CONCLUSION

Lastly, technical content according to the embodiment of the present invention will be briefly summarized. The technical content described here can be applied to various types of information processing devices, such as a personal computer (PC), a mobile phone, a mobile game console, a mobile information terminal, home information appliances, a car navigation system and the like.

The functional configuration of the above-described information processing device can be expressed in the following manner. The above-described information processing device includes a plurality of specifying devices, a music extraction portion and a list generation portion, which will be described below. The plurality of specifying devices are used to respectively specify a plurality of parameter values that represent music features. The music extraction portion extracts, from a first database in which a plurality of pieces of music are associated with the parameter values, pieces of music that match the parameter values specified using the specifying devices. The list generation portion generates a list of the pieces of music extracted by the music extraction portion.

As already explained above, music has various features. Examples of music features include tempo, brightness of melody, a type of musical instrument, and the like. Further, the mood of music perceived by a person is one of the music features. For example, a "spring-like" music mood that is perceived by a person is one of the music features. Normally, in order to find pieces of music having a "spring-like" feature, it is necessary for the user to actually listen to music. However, when the user has many pieces of music, a large amount of time and tremendous efforts are required to find "spring-like" music by actually listening to the pieces of music one by one. Due to the same reason, it is also very difficult for the user to find "spring-like" music from among a huge volume of music provided by a music seller or a huge number of pieces of music provided via a network. Of course, there are cases in which it is difficult for the user to actually listen to music that the user himself/herself does not own.

In order to address this, the inventors of the present invention has devised a system in which the mood of music is quantitatively expressed by a combination of parameter values, and pieces of music that match the combination of the parameter values are automatically extracted. For example, with the use of the above-described specifying devices, the user can easily specify parameter values that represent music features. In addition, by specifying a plurality of parameter values using a plurality of the specifying devices, it is possible to express the music mood by a combination of the parameter values. When the combination of the parameter values is specified, the above-described music extraction portion automatically extracts pieces of music that match the combination of the specified parameter values. Then, the above-described list generation portion generates a list of the automatically extracted pieces of music. By referring to the list, the user can ascertain a group of music pieces that match the mood specified by the user.

Note that, by holding the combination of the parameter values used when obtaining the list of music pieces, it is possible to easily extract pieces of music having the same mood at a later time. Note however that, in a case where music extraction is performed at a later time, if the group of music pieces as an extraction target has been changed, the group of music pieces extracted when storing the parameter values is different from the group of music pieces extracted at the later time. However, the two groups of music pieces are the groups of music pieces having the same mood. Therefore, saving of the combination of the parameter values specified by the above-described specifying devices is saving of the mood of music that the user likes. In contrast, a normal playlist is of no use if the group of music pieces as an extraction target has significantly changed.

However, when the above-described system in which only the music mood is saved is applied, even if the group of music pieces as the extraction target has significantly changed, it is possible to extract pieces of music that match the saved mood, from the changed group. The group of music pieces extracted at this time may be different from the group of music pieces extracted in the past, but it has the same mood. This feature generates the following application example. For example, let us consider a case in which a combination of parameter values is transmitted to another person. If the combination of the parameter values corresponding to a certain mood can be transmitted to another person, it is possible to share the music mood with the other person. Of course, in many cases, the group of music pieces owned by another person may be different from the group of music pieces owned by the user himself/herself. However, if the system of the present embodiment is applied, it is possible to reliably convey the music mood even without exchanging the pieces of music.

Remarks

The above-described parameter storage portion 117 is an example of an information holding portion. The above-described parameter transmitting portion 118 is an example of an information disclosure portion. The above-described parameter receiving portion 119 is an example of an information receiving portion. The above-described specifying device generation portion 1126 is an example of a type selection portion, a normalization portion and a specifying device generation portion. The above-described image data storage portion 107 is an example of an image holding portion.

It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2010-087853 filed in the Japan Patent Office on Apr. 6, 2010, the entire content of which is hereby incorporated by reference.

What is claimed is:

1. An information processing device comprising:
a plurality of specifying devices used to respectively specify a plurality of types of parameter values representing music features, the plurality of specifying devices and the respective parameter values being selectable by a user;
a music extraction portion that extracts, from a first database in which a plurality of pieces of music and the parameter values are associated with each other, pieces of music that match the parameter values specified using the specifying devices, wherein
each of the parameter values is specified by a numeric value range,
the music extraction portion identifies a plurality of music feature quantity vectors based on the numeric value range of each of the parameter values, determines that a number of the music feature quantity vectors is greater than a predetermined number of the music feature quantity vectors, and selects the predetermined number of the music feature quantity vectors in accordance with a predetermined weighting that is set for each of the parameter values;
a list generation portion that generates a list of the pieces of music extracted by the music extraction portion; and
a specifying device management portion that selects the parameter value type that matches at least a preference of the user, and causes the specifying device that corresponds to the selected parameter value type to be in an operable state.

2. The information processing device according to claim 1, further comprising:
an information holding portion that holds a combination of a type of the specifying device that is caused to be in the operable state by the specifying device management portion and the parameter value specified using the specifying device,
wherein, in a predetermined case, the music extraction portion extracts pieces of music that match the type of the specifying device held by the information holding portion and the parameter value specified using the specifying device.

3. The information processing device according to claim 2, further comprising:
an information disclosure portion that discloses the combination of the type of the specifying device that is caused to be in the operable state by the specifying device management portion and the parameter value specified using the specifying device,
wherein another information processing device that receives the type of the specifying device and the parameter value disclosed by the information disclosure portion is allowed to extract, from a second database in which a plurality of pieces of music and the parameter values are associated with each other, pieces of music that match the type of the specifying device and the parameter value that have been received.

4. The information processing device according to claim 3, further comprising:
an information receiving portion that receives, from the other information processing device, a combination of the type of the specifying device and the parameter value that can be specified using the specifying device,
wherein the music extraction portion is capable of extracting pieces of music that match the type of the specifying device and the parameter value specified using the specifying device that have been received by the information receiving portion.

5. The information processing device according to claim 3, further comprising:
a type selection portion used to select a plurality of types of the parameter values that have been set in advance;
a normalization portion that normalizes a combination of parameter values that correspond to the types selected using the type selection portion to a scalar quantity in a predetermined range; and
a specifying device generation portion that sets the scalar quantity normalized by the normalization portion as a new type of parameter value, and generates a specifying device used to specify the new type of parameter value.

6. The information processing device according to claim 3, further comprising:
a display portion that displays the list of the pieces of music that is generated by the list generation portion; and
an image holding portion that holds an image that corresponds to each of the pieces of music stored in the first database,
wherein, when the list of the pieces of music is displayed, the display portion generates divided images by dividing the image held in the image holding portion so as to match frames of the respective pieces of music included in the list of the pieces of music, and displays, in the respective frames, the divided images of the image that corresponds to the pieces of music of the respective frames.

7. The information processing device according to claim 1, further comprising:
a type selection portion used to select a plurality of types of the parameter values that have been set in advance;
a normalization portion that normalizes a combination of parameter values that correspond to the types selected using the type selection portion to a scalar quantity in a predetermined range; and
a specifying device generation portion that sets the scalar quantity normalized by the normalization portion as a new type of parameter value, and generates a specifying device used to specify the new type of parameter value.

8. The information processing device according to claim 1, further comprising:
a display portion that displays the list of the pieces of music that is generated by the list generation portion; and
an image holding portion that holds an image that corresponds to each of the pieces of music stored in the first database,
wherein, when the list of the pieces of music is displayed, the display portion generates divided images by dividing the image held in the image holding portion so as to match frames of the respective pieces of music included in the list of the pieces of music, and displays, in the respective frames, the divided images of the image that corresponds to the pieces of music of the respective frames.

9. A client device comprising:
a plurality of specifying devices used to respectively specify a plurality of types of parameter values representing music features, the plurality of specifying devices and the respective parameter values being selectable by a user;
a parameter transmitting portion that transmits to a server device the parameter values specified using the plurality of specifying devices;
a list receiving portion that, after the server device has extracted, from a first database in which a plurality of pieces of music and the parameter values are associated with each other, pieces of music that match the parameter values transmitted by the parameter transmitting portion and a list of the extracted pieces of music has been generated, receives the generated list of the pieces of music, wherein
each of the parameter values is specified by a numeric value range,
the server device identifies a plurality of music feature quantity vectors based on the numeric value range of each of the parameter values, determines that a number of the music feature quantity vectors is greater than a predetermined number of the music feature quantity vectors, and selects the predetermined number of the music feature quantity vectors in accordance with a predetermined weighting that is set for each of the parameter values; and a specifying device management portion that selects the parameter value type that matches at least a preference of the user, and causes the specifying device that corresponds to the selected parameter value type to be in an operable state.

10. A server device comprising:
a non-transitory recording medium having recorded therein a program for causing a computer to function as an information processing apparatus comprising:
a parameter receiving portion that receives parameter values specified by a client device that includes a plurality of specifying devices used to respectively specify a plurality of types of parameter values representing music features, wherein the plurality of specifying devices and the respective parameter values are selectable by a user;
a music extraction portion that extracts, from a first database in which a plurality of pieces of music and the parameter values are associated with each other, pieces of music that match the parameter values received by the parameter receiving portion, wherein
each of the parameter values is specified by a numeric value range,
the music extraction portion identifies a plurality of music feature quantity vectors based on the numeric value range of each of the parameter values, determines that a number of the music feature quantity vectors is greater than a predetermined number of the music feature quantity vectors, and selects the predetermined number of the music feature quantity vectors in accordance with a predetermined weighting that is set for each of the parameter values;
a list generation portion that generates a list of the pieces of music extracted by the music extraction portion;
a list transmitting portion that transmits, to the client device, the list of the pieces of music that is generated by the list generation portion; and
a specifying device management portion that selects the parameter value type that matches at least a preference of the user, and causes the specifying device that corresponds to the selected parameter value type to be in an operable state.

11. A list generation method, comprising the steps of:
extracting pieces of music that match parameter values specified using a plurality of specifying devices used to respectively specify a plurality of types of parameter values representing music features, from a first database in which a plurality of pieces of music and the parameter values are associated with each other, wherein
the plurality of specifying devices and the respective parameter values are selected by a user,
the plurality of types of parameter values are selected based on at least a preference of the user,
each of the parameter values is specified by a numeric value range,
a plurality of music feature quantity vectors are identified based on the numeric value range of each of the parameter values, a number of the music feature quantity vectors is greater than a predetermined number of the music feature quantity vectors, and the predetermined number of the music feature quantity vectors are selected in accordance with a predetermined weighting that is set for each of the parameter values; and
generating a list of the pieces of music extracted in the music extracting step.

12. A list acquisition method, comprising the steps of:
transmitting, to a server device from a client device that includes a plurality of specifying devices used to respectively specify a plurality of types of parameter values representing music features, the parameter values specified using the plurality of specifying devices, the plurality of specifying devices and the respective parameter values selected by a user, the plurality of types of parameter values selected based on at least a preference of the user; and
receiving, after the server device has extracted, from a first database in which a plurality of pieces of music and the parameter values are associated with each other, pieces of music that match the parameter values transmitted in the parameter transmitting step and a list of the extracted pieces of music has been generated, the generated list of the pieces of music from the server device, wherein
each of the parameter values is specified by a numeric value range,
the server device identifies a plurality of music feature quantity vectors based on the numeric value range of each of the parameter values, determines that a number of the music feature quantity vectors is greater than a predetermined number of the music feature quantity vectors, and selects the predetermined number of the music feature quantity vectors in accordance with a predetermined weighting that is set for each of the parameter values.

13. A list providing method, comprising the steps of:
receiving parameter values specified by a client device that includes a plurality of specifying devices used to respectively specify a plurality of types of parameter values representing music features, wherein the plurality of specifying devices and the respective parameter values are selected by a user, the plurality of types of parameter values are selected based on at least a preference of the user, and each of the parameter values is specified by a numeric value range;
extracting, from a first database in which a plurality of pieces of music and the parameter values are associated with each other, pieces of music that match the parameter values received in the parameter receiving step, wherein
a plurality of music feature quantity vectors are identified based on the numeric value range of each of the parameter values,
a number of the music feature quantity vectors is greater than a predetermined number of the music feature quantity vectors, and the predetermined number of the music feature quantity vectors are selected in accordance with a predetermined weighting that is set for each of the parameter values;
generating a list of the pieces of music extracted in the music extracting step; and
transmitting, to the client device, the list of the pieces of music that is generated in the list generating step.

14. A non-transitory recording medium having recorded therein a program that comprises instructions that command a computer to perform:
a music extraction function that extracts pieces of music that match parameter values specified using a plurality of specifying devices used to respectively specify a plurality of types of parameter values representing music features, from a first database in which a plurality of pieces of music and the parameter values are associated with each other, wherein the plurality of specifying devices and the respective parameter values are selected by a user, the plurality of types of parameter values are selected based on at least a preference of the user, each of the parameter values is specified by a numeric value range, the music extraction function identifies a plurality of music feature quantity vectors based on the numeric value range of each of the parameter values, determines that a number of the music feature quantity vectors is greater than a predetermined number of the music feature quantity vectors, and selects the predetermined number of the music feature quantity vectors in accordance with a predetermined weighting that is set for each of the parameter values; and a list generation function that generates a list of the pieces of music extracted by the music extraction function.

15. A non-transitory recording medium having recorded therein a program that comprises instructions that command a computer to perform:

a parameter transmitting function that transmits, to a server device, parameter values specified using a plurality of specifying devices used to respectively specify a plurality of types of parameter values representing music features, the plurality of specifying devices and the respective parameter values selected by a user, the plurality of types of parameter values selected based on at least a preference of the user; and a list receiving function that, after the server device has extracted, from a first database in which a plurality of pieces of music and the parameter values are associated with each other, pieces of music that match the parameter values transmitted by the parameter transmitting function and a list of the extracted pieces of music has been generated, receives from the server device the generated list of the pieces of music, wherein each of the parameter values is specified by a numeric value range, the server device identifies a plurality of music feature quantity vectors based on the numeric value range of each of the parameter values, determines that a number of the music feature quantity vectors is greater than a predetermined number of the music feature quantity vectors, and selects the predetermined number of the music feature quantity vectors in accordance with a predetermined weighting that is set for each of the parameter values.

16. A non-transitory recording medium having recorded therein a program that comprises instructions that command a computer to perform:

a parameter receiving function that receives parameter values specified by a client device that includes a plurality of specifying devices used to respectively specify a plurality of types of parameter values representing music features, the plurality of specifying devices and the respective parameter values selected by a user, the plurality of types of parameter values selected based on at least a preference of the user;

a music extraction function that extracts, from a first database in which a plurality of pieces of music and the parameter values are associated with each other, pieces of music that match the parameter values received by the parameter receiving function, wherein each of the parameter values is specified by a numeric value range, the music extraction function identifies a plurality of music feature quantity vectors based on the numeric value range of each of the parameter values, determines that a number of the music feature quantity vectors is greater than a predetermined number of the music feature quantity vectors, and selects the predetermined number of the music feature quantity vectors in accordance with a predetermined weighting that is set for each of the parameter values;

a list generation function that generates a list of the pieces of music extracted by the music extraction function; and a list transmitting function that transmits, to the client device, the list of the pieces of music that is generated by the list generation function.

\* \* \* \* \*